US006404562B1

(12) United States Patent
Ota et al.

(10) Patent No.: US 6,404,562 B1
(45) Date of Patent: Jun. 11, 2002

(54) ZOOM LENS

(75) Inventors: Kohei Ota; Minoru Yokota; Masae Sato, all of Hachioji (JP)

(73) Assignee: Konica Corporation, Tokyo (JP)

( * ) Notice: Subject to any disclaimer, the term of this patent is extended or adjusted under 35 U.S.C. 154(b) by 0 days.

(21) Appl. No.: 09/573,421

(22) Filed: May 18, 2000

(30) Foreign Application Priority Data

May 20, 1999 (JP) ............................................. 11-139759
Sep. 27, 1999 (JP) ............................................. 11-272312

(51) Int. Cl.[7] ............................................. G02B 15/14
(52) U.S. Cl. ....................................... 359/692; 359/683
(58) Field of Search ................................. 359/692, 690, 359/686–688, 683, 676

(56) References Cited

U.S. PATENT DOCUMENTS 5,309,285 A * 5/1994 Ito ............................... 359/692
5,786,945 A * 7/1998 Aoki et al. .................. 359/692
5,991,094 A * 11/1999 Yamamoto ................... 359/692
6,195,210 B1 * 2/2001 Tochigi ....................... 359/692

FOREIGN PATENT DOCUMENTS

JP  1-263615 A  * 10/1989
JP  3-146916 A  *  6/1991
JP  8-50243       2/1996

* cited by examiner

*Primary Examiner*—Jordan M. Schwartz
(74) *Attorney, Agent, or Firm*—Finnegan, Henderson, Farabow, Garrett & Dunner, L.L.P.

(57) ABSTRACT

A zoom lens to form an image of an object with variable magnification, is provided with a first lens group having a positive refracting power, and a second lens group positioned closer to the image than the first lens group and having a negative refracting power. When the magnification is changed, a distance between the first lens group and the second lens group is changed. The first lens group comprises a 1-1 lens, a 1-2 lens and a 1-3 lens aligned in this order from the object. The zoom lens comprises at least two plastic lenses.

17 Claims, 16 Drawing Sheets

ZOOM LENS

BACKGROUND OF THE INVENTION

The present invention relates to a zoom lens, and in particular, to a small-sized 2-group zoom lens which has less restriction of back focus and is suitable for a camera of a lens shutter type, and to a camera.

As a type of a zoom lens, there has been a 2-group zoom lens. The 2-group zoom lens is composed of a first lens group having positive refracting power and a second lens group having negative refracting power both arranged in this order from an object, and is simple in structure and has a short total length. Due to this, the 2-group zoom lens is used widely for a camera such as a lens shutter type camera.

The 2-group zoom lens is classified into a negative lens preceding type and a positive lens preceding type, depending on whether the first lens is positive or negative. The positive lens preceding type is suitable for focal length range in a telephoto system because it is easy to make a telephoto ratio to be small.

However, it has been difficult to make the 2-group zoom lens to be a compact zoom lens wherein aspects of cost are taken into consideration, because of the reason that the 2-group zoom lens of a positive lens preceding type has many constituting lenses and has many glass lens structures.

The invention has been achieved in view of the problems stated above, and its object is to provide a zoom lens which is corrected in terms of various aberrations, and is compact in structure, low in cost, excellent in image-forming performance and is suitable for a lens shutter type camera.

Further, the invention makes it possible to correct chromatic aberration satisfactorily even when many plastic lenses are used and to compensate changes in focal length and back focus caused by temperature fluctuation.

In a conventional 2-group zoom lens employing a plastic lens, there has been a problem that the number of structural lenses is large when trying to obtain a large zoom ratio, resulting in complicated structure and an increase in cost. In particular, when many plastic lenses are used in a 2-group zoom lens, for the purpose of low cost, a large ratio of magnification tends not to be obtained, compared with an occasion wherein many glass lenses which are relatively expensive are used, resulting in poor balance between cost and function.

Another object of the invention is to provide a zoom lens which is of low cost, corrected satisfactorily in terms of various aberrations even when a zoom ratio is large, and is suitable for a lens shutter type camera.

SUMMARY OF THE INVENTION

The objects stated above can be attained by either one of the following structures.

Structure (1-1) A zoom lens to form an image of an object with variable magnification, comprises:
 a first lens group having a positive refracting power, and
 a second lens group positioned closer to the image than the first lens group and having a negative refracting power,
 wherein, when the magnification is changed, a distance between the first lens group and the second lens group is changed,
 wherein the first lens group comprises a 1-1 lens, a 1-2 lens and a 1-3 lens aligned in this order from the object, and
 wherein the zoom lens comprises at least two plastic lenses.

Structure (1-2) In the zoom lens of Structure (1-1), the first lens group does not comprise a 1-4 lens and the second lens group comprises a 2-1 lens and a 2-2 lens aligned in this order from the object, and the 1-1 lens is a plastic lens, the 1-3 lens has a positive refracting power and the 2-2 lens has a negative refracting power.

Structure (1-3) In the zoom lens of Structure (1-2), the 1-2 lens has a negative refracting power and following formulas are satisfied:

$$1.50 \leq n_{1-3} \leq 1.90$$
$$1.50 \leq n_{2-2} \leq 1.90$$

where $n_{1-3}$ is a refractive index of the 1-3 lens, and $n_{2-2}$ is a refractive index of the 2-2 lens.

Structure (1-4) In the zoom lens of Structure (1-2), the 1-2 lens is a plastic lens, at least four surfaces of the lenses in the entire system of the zoom lens is an aspherical surface, and a following formula is satisfied:

$$1.50 \leq n_{2-2} \leq 1.90$$

where $n_{2-2}$ is a refractive index of the 2-2 lens.

Structure (1-5) In the zoom lens of Structure (1-2), the 1-2 lens is a plastic lens and following formulas are satisfied:

$$1.50 \leq n_{1-3} \leq 1.90$$
$$1.50 \leq n_{2-2} \leq 1.90$$

where $n_{1-3}$ is a refractive index of the 1-3 lens, and $n_{2-2}$ is a refractive index of the 2-2 lens.

Structure (1-6) In the zoom lens of Structure (1-2), the 1-1 lens is a plastic lens having a positive refractive power, the 1-2 lens is a plastic lens, the 1-3 lens is a meniscus shaped glass lens having a positive refractive power wherein an image side surface of the meniscus shaped glass lens is concave, and the 2-2 lens is a plastic lens having a negative refractive power.

Structure (1-7) In the zoom lens of Structure (1-2), the 2-1 lens is a glass lens.

Structure (1-8) In the zoom lens of Structure (1-2), the 1-4 lens has at least one aspherical surface and following formulas are satisfied:

$$0.64 \leq f_W/D \leq 1.0$$
$$0.50 \leq |f_{RC}|/f_W \leq 0.80$$

where $f_W$ is a focal length of the zoom lens at a wide angle end, D is a length of a diagonal line of an image plane, and $f_{RC}$ is a focal length of the second lens group.

Structure (1-9) In the zoom lens of Structure (1-2), the 1-1 lens is a positive refracting power and has at lease one aspherical surface, the 2-1 lens is a plastic lens and has at lease one aspherical surface, and a following formula is satisfied:

$$-5 \leq (\phi_P + \phi_4) \cdot f_T^2/F_T \leq 5$$

where $\phi_P$ is a power of a plastic lens of the first lens group, $\phi_4$ is a power of the 2-1 lens, $f_T$ is a focal length of the zoom lens at a telephoto end and $F_T$ is a F-number of the zoom lens at a telephoto end.

Structure (1-10) In the zoom lens of Structure (1-1), the first lens group comprises a 1-4 lens which is a glass lens having a positive refracting power and the second lens group comprises a 2-1 lens and a 2-2 lens, and wherein the first lens group comprises at least one plastic lens having a negative refracting power and at least one plastic lens having a positive refracting power.

Structure (1-11) In the zoom lens of Structure (1-1), the magnification ratio is 2.3 or more, the first lens group comprises a 1-4 lens and the second lens group comprises a 2-1 lens and a 2-2 lens, and wherein the first lens group comprises at least one plastic lens having a negative refracting power and at least one plastic lens having a positive refracting power.

Structure (1-12) In the zoom lens of Structure (1-1), the first lens group is separated by the largest air space into a 1-a lens sub-group and a 1-b lens sub-group, and the second lens group comprises a 2-1 lens and a 2-2 lens, and wherein the 1-a lens sub-group comprises at least two lenses comprising at least one plastic lens having a negative power and the 1-b lens sub-group comprises at least two lenses comprising at least one plastic lens having a positive power Structure (1-13) In the zoom lens of Structure (1-1), the first lens group comprises at least one glass lens and at least three plastic lenses and the second lens group comprises at most two lenses comprising at least one plastic lens.

Structure (1-14) In the zoom lens of Structure (1-1), the first lens group comprises at least two glass lenses and at least two plastic lenses, the second lens group comprises a 2-1 lens and a 2-2 lens and a following formula is satisfied:

$$-0.50 \leq |f_{RC}|/f_{2-1} \leq 0.20$$

where $f_{RC}$ is a focal length of the second lens group and $f_{2-1}$ is a focal length of the 2-1 lens.

Structure (1-15) In the zoom lens of Structure (1-1), all of the plastic lenses of the zoom lens have a saturated water absorption of 1.2% or less.

Structure (1-16) In the zoom lens of Structure (1-1), all of the plastic lenses of the zoom lens have a refractive index of 1.5 or more.

Structure (1-17) In the zoom lens of Structure (1-1), the 1-1 lens is a plastic lens having a positive refracting power.

Structure (1-18) A camera to photograph an image of an object with variable magnification, comprises:
  a zoom lens having
    a first lens group having a positive refracting power, and
    a second lens group positioned closer to the image than the first lens group and having a negative refracting power,
  wherein when the magnification is changed, a distance between the first lens group and the second lens group is changed,
  wherein the first lens group comprises a 1-1 lens, a 1-2 lens and a 1-3 lens aligned in this order from the object, and
  wherein the zoom lens comprises at least two plastic lenses.

Structure (1-19) In the camera of Structure (1-18), the first lens group does not comprise a 1-4 lens and the second lens group comprises a 2-1 lens and a 2-2 lens aligned in this order from the object, and
  wherein the 1-1 lens is a plastic lens, the 1-3 lens has a positive refracting power and the 2-2 lens has a negative refracting power.

Further, the objects stated above may be attained by either one of the following preferable structures.

Structure (2-1) A zoom lens composed of a first lens group having positive refracting power and a second lens group having negative refracting power both arranged in this order from an object, in which a magnifying power is varied by changing a distance between the first lens group and the second lens group, wherein the first lens group is composed of three lens elements including a 1-1 lens, a 1-2 lens and a 1-3 lens arranged in this order from an object and of a diaphragm located to be closer to images formed by the lenses, and the 1-1 lens is a plastic lens, the 1-2 lens has negative refracting power and the 1-3 lens has positive refracting power, while, the second lens group is composed of two lens elements, one is a 2-1 lens and the other is a 2-2 lens having negative refracting power wherein both lenses are arranged in this order from an object, and the following conditions are satisfied.

$$1.50 \leq n_{1-3} \leq 1.90 \qquad (1)$$

$$1.50 \leq n_{2-2} \leq 1.90 \qquad (2)$$

wherein
  $n_{1-3}$: Refractive index of 1-3 lens
  $n_{2-2}$: Refractive index of 2-2 lens Structure (2-2) In the zoom lens according to Structure (2-1), the 1-3 lens is a glass lens.

Structure (2-3) In the zoom lens according to Structure (2-1) or (2-2), at least one surface of 2-1 lens is an aspherical surface and the following conditions are satisfied.

$$0.64 \leq f_W/D \leq 1.0 n_{1-3} \qquad (3)$$

$$0.50 \leq |f_{RC}|/f_W \leq 0.80 \qquad (4)$$

wherein
  $f_W$: Focal length at wide angle end
  D: Length of a diagonal line of an image plane
  $f_{RC}$: Focal length of the second lens group Structure (2-4) In the zoom lens according to Structure (2-1), the 1-1 lens is a plastic lens which has positive refracting power and employs an aspherical surface on at least one of its surfaces, while the 2-1 lens is a plastic lens which employs an aspherical surface on at least one of its surfaces, and satisfies the following condition.

$$-5 \leq (\phi_P + \phi_4) \cdot f_T^2/F_T < 5 \qquad (5)$$

wherein
  $\phi_P$: Power of a plastic lens in the 1-1 lens
  $\phi_4$: Power of the 2-1 lens
  $f_T$: Focal length at telephoto end
  $F_T$: F-number at telephoto end Structure (2-5) A zoom lens composed of a first lens group having positive refracting power and a second lens group having negative refracting power both arranged in this order from an object, in which a magnifying power is varied by changing a distance between the first lens group and the second lens group, wherein the first lens group is composed of three lens elements including a 1-1 lens, a 1-2 lens and a 1-3 lens arranged in this order from an object and of a diaphragm located to be closer to images formed by the lenses, and the 1-1 lens and the 1-2 lens are represented by a plastic lens, the 1-3 lens has positive refracting power while, the second lens group is composed of two lens elements one is a 2-1 lens and the other is a 2-2 lens having negative refracting power wherein both lenses are arranged in this order from an object, and an aspherical surface is used on at least four surfaces and the following conditions are satisfied.

$$1.50 \leq n_{2-2} \leq 1.90 \quad (6)$$

wherein $n_{2-2}$: Refractive index of the 2-2 lens

Structure (2-6) In the zoom lens according to Structure (2-5), the 1-3 lens is a glass lens.

Structure (2-7) In the zoom lens according to Structure (2-5) or (2-6), at least one surface of the 2-1 lens is an aspherical surface and the following conditions are satisfied.

$$0.64 \leq f_W/D \leq 1.0 \quad (7)$$

$$0.50 \leq |f_{RC}|/f_W \leq 0.80 \quad (8)$$

wherein $f_W$: Focal length at wide angle end

D: Length of a diagonal line of an image plane $f_{RC}$: Focal length of the second lens group Structure (2-8) In the zoom lens according to either one of Structures (2-5)–(2-7), the 1-1 lens has positive refracting power, the 1-2 lens has negative refracting power, while the 2-1 lens is a plastic lens and the following condition is satisfied.

Incidentally, the length D of a diagonal line of an image plane is represented by the following formula:

$$D = 2 \times f_W \times \tan \omega_W$$

Where $\omega_W$ is the largest half angle of view at the wide angle end.

$$-5 \leq (\phi_1 + \phi_2 + \phi_4) \cdot f_T^2 / F_T \leq 5 \quad (9)$$

wherein $\phi_i$: Power of i-th lens $f_T$: Focal length at telephoto end $F_T$: F-number at telephoto end Structure (2-9) A zoom lens composed of a first lens group having positive refracting power and a second lens group having negative refracting power both arranged in this order from an object, in which a magnifying power is varied by changing a distance between the first lens group and the second lens group, wherein the first lens group is composed of three lens elements including a 1-1 lens, a 1-2 lens and a 1-3 lens arranged in this order from an object and of a diaphragm located to be closer to images formed by the lenses, and the 1-1 lens and the 1-2 lens are represented by a plastic lens, the 1-3 lens has positive refracting power, while, the second lens group is composed of two lens elements one is a 2-1 lens and the other is a 2-2 lens having negative refracting power wherein both lenses are arranged in this order from an object, and the following conditions are satisfied.

$$1.50 \leq n_{1-3} \leq 1.90 \quad (10)$$

$$1.50 \leq n_{2-2} \leq 1.90 \quad (11)$$

wherein $n_{1-3}$: Refractive index of 1-3 lens $n_{2-2}$: Refractive index of 2-2 lens Structure (2-10) In the zoom lens according to Structure (2-9), the 1-3 lens is a glass lens.

Structure (2-11) In the zoom lens according to Structure (2-9) or (2-10), at least one surface of 2-1 lens is an aspherical surface and the following conditions are satisfied.

$$0.64 \leq f_W/D \leq 1.0 \quad (12)$$

$$0.50 \leq |f_{RC}|/f_W \leq 0.80 \quad (13)$$

wherein $f_W$: Focal length at wide angle end

D: Length of a diagonal line of an image plane $f_{RC}$: Focal length of the second lens group Structure (2-12) In the zoom lens according to either one of Structures (2-9)–(2-11), the 1-1 lens has positive refracting power and at least one surface of which is an aspherical surface, the 1-2 lens has negative refracting power and at least one surface of which is an aspherical surface, while the 2-1 lens is a plastic lens and the following condition is satisfied.

$$-5 \leq (\phi_1 + \phi_2 + \phi_4) \cdot f_T^2 / F_T \leq 5 \quad (14)$$

wherein $\phi_i$: Power of i-th lens $f_T$: Focal length at telephoto end $F_T$: F-number at telephoto end Each conditional expression will be explained here.

BRIEF DESCRIPTION OF THE DRAWINGS

FIG. 2(A) shows them at a short focal point end, FIG. 2(B) shows them at a medium point and FIG. 2(C) shows them at a long focal point end in Example 1.

FIG. 4(A) shows them at a short focal point end, FIG. 4(B) shows them at a medium point and FIG. 4(C) shows them at a long focal point end in Example 2.

FIG. 6(A) shows them at a short focal point end, FIG. 6(B) shows them at a medium point and FIG. 6(C) shows them at a long focal point end in Example 3.

FIG. 8(A) shows them at a short focal point end, FIG. 8(B) shows them at a medium point and FIG. 8(C) shows them at a long focal point end in Example 4.

FIG. 10(A) shows them at a short focal point end, FIG. 10(B) shows them at a medium point and FIG. 10(C) shows them at a long focal point end in Example 5.

FIG. 12(A) shows them at a short focal point end, FIG. 12(B) shows them at a medium point and FIG. 12(C) shows them at a long focal point end in Example 6.

FIG. 14(A) shows them at a short focal point end, FIG. 14(B) shows them at a medium point and FIG. 14(C) shows them at a long focal point end in Example 7.

FIG. 16(A) shows them at a short focal point end, FIG. 16(B) shows them at a medium point and FIG. 16(C) shows them at a long focal point end in Example 8.

DETAILED DESCRIPTION OF THE INVENTION

Figure 1:
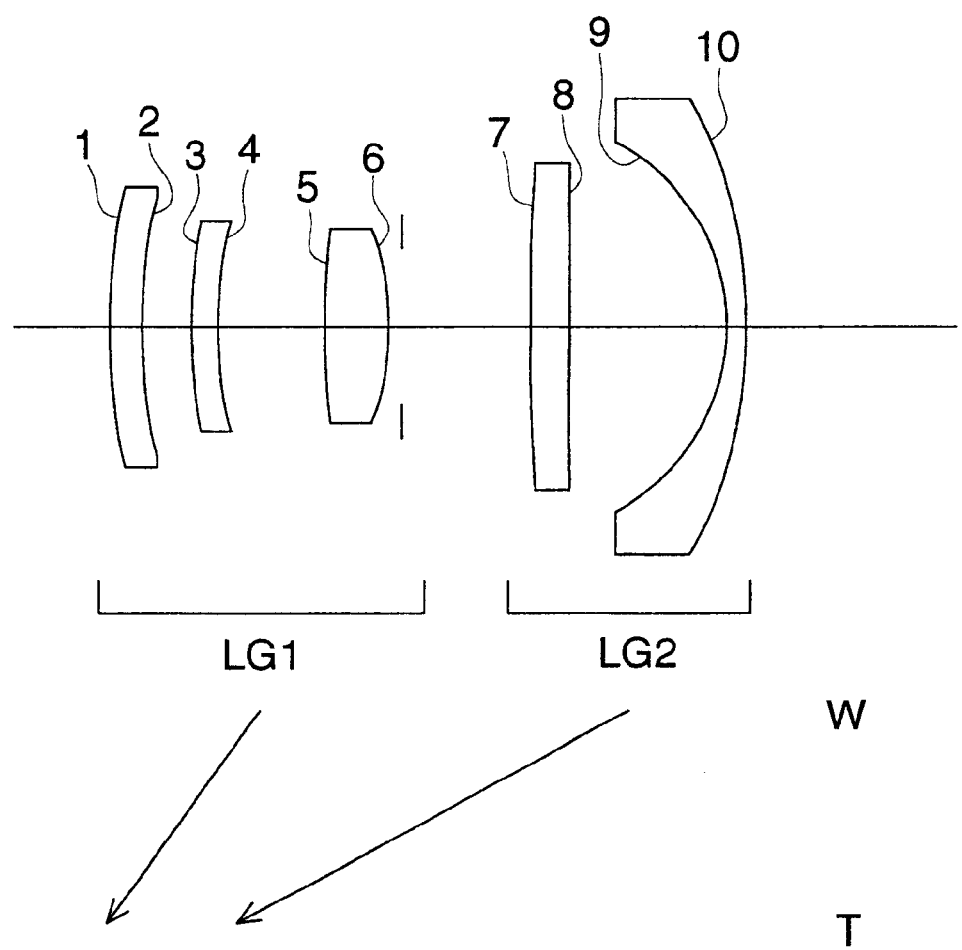
FIG. 1 is a sectional view of a lens in Example 1.

In the zoom lens of the invention, there are provided a first lens group having positive refracting power and a second lens group having negative refracting power, and a distance between the first lens group and the second lens group is changed when varying the magnifying power. Further, the first lens group has therein a 1-1 lens, a 1-2 lens and a 1-3 lens all arranged in this order from the object. The zoom lens has at least two plastic lenses.

Incidentally, the zoom lens of the invention is one suitable for a 2-group zoom lens having neither the third lens group nor the fourth lens group. The zoom lens of the invention preferably has a diaphragm, and it is preferable that the first lens group has the diaphragm.

"Lens group" mentioned in the invention is a set of lenses which move solidly in the same way when varying the magnifying power. Incidentally, the lens group may be composed either of a single lens or of plural lenses.

The camera of the invention is one having therein the zoom lens of the invention. It can be applied either to a photographic camera or to a digital still camera.

Conditional expressions (1) and (10) determine an appropriate range of refractive index of the third lens. By satisfying these conditions, coma can further be improved and the field curvature can also be made better. Incidentally, refractive index is one for d ray.

Conditional expressions (2), (6) and (11) determine an appropriate range of refractive index of the fifth lens. By satisfying these conditions, distortion on the part of the wide angle side can further be improved. Incidentally, refractive index is one for d ray.

Conditional expressions (3), (7) and (12) determine a focal length at a wide angle end which is suitable for the zoom lens of the invention. By satisfying this condition, it is possible to obtain a compact zoom lens without having lack of illumination of the edge of image field.

Conditional expressions (4), (8) and (13) determine an appropriate range of a focal length of the second lens group. By satisfying these conditions, it is possible to obtain a compact zoom lens which has less deterioration by aberration and is suitable for grinding of glass.

Conditional expressions (5), (9) and (14) represent conditions to repress fluctuation of a focus position caused by temperature change, and when the conditions are satisfied by the power of a plastic lens in the first lens group and by that of a plastic lens in the second lens group, it is possible to control the fluctuation of focus position within a depth of focus, at the telephoto end where the fluctuation of focus position caused by temperature change is great.

Under the assumption that temperature ν values of all plastic lenses are represented by the same value $\nu_T$, and a height of axial ray at a telephoto end is roughly the same for all plastic lenses, the focus position fluctuation $\delta_S$ is approximately expressed by the following expression.

$$\delta_S = -f_T^2(\phi_P + \phi_4)/\nu_T$$

wherein $\nu_T = n_{d-1}/\Delta n$ $\nu_T$: Temperature ν value $\Delta n$: Fluctuation of refractive index for temperature change $\Delta T$ Under the condition that a diameter of a circle of confusion is 0.05 mm and a depth of focus is ±0.05 mm $F_T$ ($F_T$ is F-number at telephoto end), $\nu_T$ for temperature change of 30+ C. is about −100, so, conditional expression (5) is for $\delta_S$ to be within the depth of focus.

A zoom lens which is composed of a first lens group having positive refracting power and a second lens group having negative refracting power both arranged in this order from the object, and is varied in terms of magnifying power when a distance between the first lens group and the second lens group is changed, wherein, it is preferable that the first lens group is composed of four lens elements including 1-1 lens, 1-2 lens, 1-3 lens and 1-4 lens all arranged in this order from the object, and has at least one plastic lens having negative refracting power and at least one plastic lens having positive refracting power, and the 1-4 lens is a glass lens having positive refracting power and the second lens group is composed of two lens elements including 2-1 lens and 2-2 lens.

As stated above, when using many plastic lenses that can be produced on a mass production basis, it is possible not only to attain cost reduction but also to realize a lightweight zoom lens. By using a negative plastic lens and a positive plastic lens and by arranging a glass lens properly, all in the first lens group, and by making the second lens group to be of 2-element structure, it has become possible to provide a compact zoom lens having a variable power ratio of 2.3 or more, for example, wherein chromatic aberration, compensation of temperature fluctuation, and other aberrations are corrected in a well-balanced way.

It is preferable that the following conditions are satisfied.

$$0.64 \leq f_W/D \leq 1.0 \tag{15}$$

$$0.50 \leq |f_{RC}|/f_W \leq 0.85 \tag{16}$$

wherein $f_W$: Focal length at wide angle end

D: Length of a diagonal line of an image plane $f_{RC}$: Focal length of the second lens group Conditional expression (15) determines a focal length at a wide angle end which is suitable for the zoom lens having a high variable power. When the value $f_W/D$ is not lower than the lower limit value, it is possible to secure the illumination of the edge of image field sufficiently and to secure a long back focus. Thereby, it is possible to secure compactness in the radial direction, by making a diameter of a rear lens to be small. On the other hand, when the value $f_W/D$ is not more than the upper limit value, it is possible to make a total length of a zoom lens to be short.

Further, conditional expression (16) is to determine an appropriate range of a focal length of the second lens group. If the value $|f_{RC}|/f_W$ is not lower than the lower limit value and an absolute value of a focal length of the second lens group is treat, deterioration of aberration can be controlled, a radius of curvature of a specific concave surface is not too small, and processing of glass grinding can be conducted easily, when the second lens group is composed of two lenses or less. On the other hand, when the value $|f_{RC}|/f_W$ is not higher than the upper limit value, an amount of movement for zooming of the second lens group can be limited to be small, and thereby, compactness of a zoom lens barrel can be secured.

It is preferable that the following condition is satisfied.

$$0.9 \leq f_{1-4}/f_{FC} \leq 2.0 \tag{17}$$

wherein $f_4$: Focal length of the 1-4 lens $f_{FC}$: Focal length of the first lens group Conditional expression (17) is one wherein conditions relating to the focal length of the 1-4 lens are stipulated. Namely, when the value $f_{1-4}/f_{FC}$ is not less than the lower limit value, it is possible to keep the spherical aberration to be small, and to keep the sensitivity to eccentricity showing an influence on an optical axis shifting to be small. On the other hand, if the value $f_{1-4}/f_{FC}$ is not higher than the upper limit value, it is possible to keep distortion and lateral chromatic aberration to be small, and to make a ratio of variable power to be great.

It is preferable that the 2-1 lens is a plastic lens wherein at least one surface is aspherical, the 2-2 lens is a glass lens, and the following condition is further satisfied.

$$-6 \leq (\phi_P + \phi_S) \cdot f_r^2 / F_r \leq 6 \qquad (18)$$

wherein $\phi_P$: The sum of powers of plastic lenses in the first lens group $\phi_S$: Power of fifth lens $f_r$: Focal length at telephoto end $F_r$: F-number at telephoto end Together with conditional expressions (23) and (25) described later, the conditional expression (18) represents conditions to repress the fluctuation of focus position caused by temperature change, and when a plastic lens in the first lens group and a plastic lens in the second lens group are set so that the conditions stated above are satisfied, it is possible to control the fluctuation of focus position to be within a depth of focus, at a telephoto end where the fluctuation of focus position caused by temperature change is great.

Now, under the assumption that temperature Abbe Numbers of all plastic lenses are represented by the same value vT, and a height of axial ray at a telephoto end is roughly the same for all plastic lenses, the focus position fluctuation $\delta S$ is approximately expressed by the following expression.

$$\Delta S = -f_T (\phi_P + \phi_S) / vT \qquad (19)$$

wherein $vT = nd-1/\Delta n$ $vT$: Temperature Abbe number n: Fluctuation of refractive index for temperature change $\Delta T$ Under the condition that a diameter of a circle of confusion is 0.06 mm and a depth of focus is ±0.06 mm $F_T$ ($F_T$ is F-number at telephoto end), vT for temperature change of 30° C. is about −100, therefore, conditional expressions (18), (23) and (25) are established as conditions for $\delta S$ to be in the depth of focus in the case of a zoom lens having a high variable power.

Incidentally, in the case of positive and negative 2-group zoom lens, when 1-1 lens is made to be a positive lens, a telephoto ratio can be made small easily to be suitable for a range of a focal length in a telephotographic system.

The 1-1 lens has positive refracting power and is characterized to satisfy the following condition.

$$2.8 \leq f_{1-1}/f_{FC} \leq 7.0 \qquad (6)$$

wherein $f_{1-1}$: Focal length of 1-1 lens $f_{FC}$: Focal length of first lens group In conditional expression (6), there are stipulated the conditions concerning a focal length of 1-1 lens. When the value $f_{1-1}/f_{FC}$ is not lower than the lower limit value, distortion at a wide angle end is small, and a great variable power ratio can be secured. On the other hand, when the value $f_{1-1}/f_{FC}$ is not higher than the upper limit value, a telephotographic ratio is controlled not to be too great and thereby, correction of lateral chromatic aberration can be made to be easy.

A zoom lens which is composed of a first lens group having positive refracting power and a second lens group having negative refracting power both arranged in this order from the object, and is varied in terms of magnifying power when a distance between the first lens group and the second lens group is changed, and has a variable power ratio of 2.3 or more, wherein, it is preferable that the first lens group is composed of four lens elements including a 1-1 lens, a 1-2 lens, a 1-3 lens and a 1-4 lens all arranged in this order from the object, and has at least one plastic lens having negative refracting power and at least one plastic lens having positive refracting power, and the second lens group is composed of two lens elements including a 2-1 lens and a 2-2 lens.

When the first lens group is structured with four lenses including at least one plastic lens having negative refracting power and at least one plastic lens having positive refracting power, it is possible to control the fluctuation of focus position caused by temperature change and to correct various aberrations satisfactorily, even in the case of a zoom lens having a variable power ratio of 2.3 or more.

In the zoom lens stated above, it is preferable that the following conditions are satisfied.

$$0.64 \leq f_W/D \leq 1.0 \qquad (15)$$

$$0.50 \leq |f_{RC}|/f_W \leq 0.85 \qquad (16)$$

wherein $f_W$: Focal length at a wide angle end

D: Length of a diagonal line of an image plane $f_{RC}$: Focal length of the second lens group In the zoom lens stated above, it is preferable that the 2-1 lens is a plastic lens wherein at least one surface is aspherical, the 2-2 lens is a glass lens, and the following condition is further satisfied.

$$-6 \leq (\phi_P + \phi_{2-1}) \cdot f_r^2 / F_r \leq 6 \qquad (18)$$

wherein $\phi_P$: The sum of powers of plastic lenses in the first lens group $\phi_{2-1}$: Power of the 2-1 lens $f_r$: Focal length at telephoto end $F_r$: F-number at telephoto end In the zoom lens stated above, it is preferable that the 1-1 lens has positive refracting power, and the following condition is satisfied.

$$2.8 \leq f_{1-1}/f_{FC} \leq 7.0 \qquad (20)$$

wherein $f_{1-1}$: Focal length of 1-1 lens $f_{FC}$: Focal length of the first lens group A zoom lens which is composed of a first lens group having positive refracting power and a second lens group having negative refracting power both arranged in this order from the object, and is varied in terms of magnifying power when a distance between the first lens group and the second lens group is changed, wherein, it is preferable that the first lens group is divided by the air interval largest in that group into 1a-th lens group and 1b-th lens group, and the 1a-th lens group is composed of two or more lens elements and has at least one plastic lens having negative refracting power, while the 1b-th lens group is composed of two or more lens elements and has at least one plastic lens having positive refracting power, and the second lens group is composed of two or more lens elements.

By increasing the distance between two plastic lenses, it is possible to make the refracting power of the surface to be small, and to control the sensitivity to eccentricity to be small.

In the zoom lens stated above, it is preferable that the following condition is satisfied.

$$0.64 \leq f_W/D \leq 1.0 \tag{15}$$

$$0.50 \leq |f_{RC}|/f_W \leq 0.85 \tag{16}$$

wherein $f_W$: Focal length at a wide angle end

D: Length of a diagonal line of an image plane $f_{RC}$: Focal length of the second lens group In the zoom lens stated above, it is preferable that the following condition is satisfied.

$$0.06 \leq D_{ab}/f_{FC} \leq 0.25 \tag{21}$$

wherein $D_{ab}$: Distance between 1-a lens sub-group and 1-b lens sub-group $f_{FC}$: Focal length of the first lens group In conditional expression (21), there are stipulated conditions relating to the distance between 1a-th lens group and 1b-th lens group. Namely, when the value $D_{ab}/f_{FC}$ is not lower than the lower limit value, it is possible to repress deterioration of spherical aberration and coma and to correct various aberrations in a well-balanced way. On the other hand, when the value $D_{ab}/f_{FC}$ is not more than the upper limit value, it is possible to make a lens small.

The zoom lens stated above is characterized to satisfy the following conditions.

$$0.64 \leq f_{1-b}/f_{FC} \leq 1.0 \tag{22}$$

wherein $f_{1-b}$: Focal length of (1-b)-th lens sub-group $f_{FC}$: Focal length of the first lens group In conditional expression (22), there are stipulated conditions relating to the focal length of the (1-b)-th lens sub-group. Namely, when the value $f_{1-b}/f_{FC}$ is not less than the lower limit value, spherical aberration is small, and sensitivity to eccentricity can be repressed to be small. On the other hand, when the value $f_{1-4}/f_{FC}$ is not higher than the upper limit value, distortion is small and lateral chromatic aberration can be repressed to be small.

In the zoom lens mentioned above, it is preferable that the second lens group is composed of a plastic lens wherein an aspherical surface is used on at least one surface of the plastic lens and of a glass lens, and the following condition is further satisfied.

$$-6 \leq (\phi P_{FC} + \phi P_{RC}) \cdot f_r^2 / F_r \leq 6 \tag{23}$$

wherein $\phi P_{FC}$: The sum of powers of plastic lenses in the first lens group $\phi P_{RC}$: Power of plastic lens in the second lens group $f_r$: Focal length at a telephoto end $F_r$: F-number at a telephoto end In the zoom lens stated above, it is preferable that the first lens group is composed of four lens elements including a 1-1 lens, a 1-2 lens, a 1-3 lens and a 1-4 lens all arranged in this order from an object.

It is preferable that the 1-1 lens has positive refracting power, and the following conditions are further satisfied.

$$2.8 \leq f_{1-1}/f_{FC} \leq 7.0 \tag{20}$$

wherein $f_{1-1}$: Focal length of 1-1 lens $f_{FC}$: Focal length of the first lens group A zoom lens which is composed of a first lens group having positive refracting power and a second lens group having negative refracting power both arranged in this order from the object, and is varied in terms of magnifying power when a distance between the first lens group and the second lens group is changed, wherein, it is preferable that the first lens group is composed of four or more lens elements including one glass lens and three or more plastic lenses, and the second lens group is composed of two lens elements or less and has at least one plastic lens.

A plastic lens makes it possible to achieve cost reduction thereof when it is manufactured on a mass production basis, and it contributes to lightening of a zoom lens. When the first lens group is composed of one glass lens and three or more plastic lenses and the second lens group is composed also of plastic lenses, most of lens elements are represented by the plastic lens except one glass lens which compensates for temperature change, resulting in achievement of drastic cost reduction and lightening of a lens.

In the zoom lens stated above, it is preferable that the first lens group is divided by the air interval largest in that group into (1-a)-th lens group and (1-b)-th lens sub-group, and the glass lens is included in the (1-b)-th lens sub-group.

If a glass lens is used in the (1-b)-th lens sub-group, cost reduction can further be achieved because a diameter of the lens is small.

It is preferable that the following conditions are satisfied.

$$0.64 \leq f_W/D \leq 1.0 \tag{1}$$

$$0.50 \leq |f_{RC}|/f_W \leq 0.85 \tag{2}$$

wherein $f_W$: Focal length at a wide angle end

D: Length of a diagonal line of an image plane $f_{RC}$: Focal length of the second lens group It is preferable that the following conditions are satisfied.

$$0.06 \leq D_{ab}/f_{FC} \leq 0.25 \tag{21}$$

wherein $D_{ab}$: Distance between 1-a lens sub-group and 1-b sub-lens group $f_{FC}$: Focal length of the first lens group In the zoom lens stated above, it is preferable that the following condition is satisfied.

$$0.64 \leq f_{1-b}/f_{FC} \leq 1.0 \tag{22}$$

wherein $f_{1-b}$: Focal length of 1-b lens sub-group $f_{RC}$: Focal length of the second lens group In the zoom lens mentioned above, it is characterized that an aspherical surface is used on at least one surface of a plastic lens in the second lens group, and the following condition is further satisfied.

$$-6 \leq (\phi P_{FC} + \phi P_{RC}) \cdot f_r^2 / F_r \leq 6 \quad (23)$$

wherein $\phi P_{FC}$: The sum of powers of plastic lenses in the first lens group $\phi P_{RC}$: The sum of powers of plastic lenses in the second lens group $f_r$: Focal length at a telephoto end $F_r$: F-number at a telephoto end It is characterized that 1-1 lens having positive refracting power is arranged to be closest to an object in the first lens group, and the following condition is satisfied.

$$2.8 \leq f_{1-1}/f_{FC} \leq 7.0 \quad (20)$$

wherein $f_{1-1}$: Focal length of 1-1 lens $f_{FC}$: Focal length of the first lens group A zoom lens which is composed of a first lens group having positive refracting power and a second lens group having negative refracting power both arranged in this order from the object, and is varied in terms of magnifying power when a distance between the first lens group and the second lens group is changed, wherein the first lens group is composed of two or more glass lenses and two or more plastic lenses, while, the second lens group is composed of two lens elements including (2-1)th lens and (2-2)th lens, and the following condition is satisfied.

$$-0.5 \leq |f_{RC}|/f_{2-1} \leq 0.2 \quad (24)$$

wherein $f_{2-1}$: Focal length of (2-2)th lens $f_{RC}$: Focal length of the second lens group In a zoom lens wherein many plastic lenses are used, when two or more glass lenses and two or more plastic lenses are used in the first lens group, it is possible to correct satisfactorily chromatic aberration and changes in characteristics caused by temperature change while achieving cost reduction and lightening of lenses.

Further, conditional expression (24) stipulates conditions relating to the focal length of (2-1)th lens. When the value $|f_{RC}|/f_{2-1}$ is not lower than the lower limit value, not lower than the lower limit value, chromatic aberration can easily be corrected because negative refracting power of (2-1)th lens can be repressed. On the other hand, when the value $|f_{RC}|/f_{2-1}$ is not higher than the lower limit, distortion can be repressed to be small because refracting power of (2-2)th lens can be made weak.

In the zoom lens mentioned above, it is preferable that the first lens group has therein at least one glass lens having Abbe number of 60 or more and at least one glass lens having Abbe number of 30–50.

In the glass lens of the first lens group, when at least one material having Abbe number of 60 or more and at least one material having Abbe number of 30–50 are used, chromatic aberration can be corrected in a well-balanced way, both at a wide angle end and at a telephoto end.

It is preferable that the following conditions are satisfied.

$$0.64 \leq f_W/D \leq 1.0 \quad (15)$$

$$0.50 \leq |f_{RC}|/f_W \leq 0.85 \quad (16)$$

wherein $f_W$: Focal length at a wide angle end

D: Length of a diagonal line of an image plane $f_{RC}$: Focal length of the second lens group It is preferable that the (2-1)th lens is a plastic lens wherein at least one surface is aspherical, the (2-2)th lens is a glass lens, and the following condition is further satisfied.

$$-6 \leq (\phi P_{FC} + \phi P_{2-1}) \cdot f_r^2 / F_r \leq 6 \quad (11)$$

wherein $\phi P_{FC}$: The sum of powers of plastic lenses in the first lens group $\phi P_{2-1}$: Power of (2-1)th lens $f_r$: Focal length at telephoto end $F_r$: F-number at telephoto end It is characterized that (1-1)th lens having positive refracting power is arranged to be closest to an object in the first lens group, and the following condition is satisfied.

$$2.8 \leq f_{1-1}/f_{FC} \leq 7.0 \quad (6)$$

wherein $f_1$: Focal length of (1-1)th lens $f_{FC}$: Focal length of the first lens group In a 2-group zoom lens composed of the first lens group having positive refracting power and the second lens group having negative refracting power, it is preferable that two or more plastic lenses are included, and saturation water absorption of all of the included plastic lenses is not more than 1.2%.

In the zoom lens stated above, it is preferable that saturation water absorption of the plastic lens mentioned above is not more than 0.7%.

Compared with a glass lens, saturation water absorption of the plastic lens is high, and therefore, when humidity is changed suddenly, the plastic lens tends to show transiently the uneven distribution of an amount of water absorption, resulting in uneven refractive index and inability to obtain excellent performance. Therefore, if all plastic lenses are made to have saturation water absorption of not more than 1.2% (preferably, 0.7% or less), the troubles stated above can be lightened. Incidentally, since polyolefin type materials, polycarbonate type materials and polystyrene type material have small saturation water absorption, it is possible to prevent deterioration of performance of the plastic lens that is caused by a change of humidity, by using the materials mentioned above.

In the zoom lens stated above, it is preferable that the following condition is satisfied.

$$3 \leq f_r/f_{FC} \leq 6 \quad (26)$$

wherein $f_r$: Focal length at telephoto end $f_{FC}$: Focal length of the first lens group In a positive and negative 2-group zoom lens, aberration of the first lens group is enlarged by the image forming magnification of the second lens group. Since the image forming magnification is great at the telephoto end, in particular, it is necessary to make the refracting power of the first lens group to be appropriate.

In conditional expression (26), when the value $f_r/f_{FC}$ is the lower limit value or higher, it is possible to make the second lens group to be small in size because a back focus can be made long. When the value $f_r/f_{FC}$ is not higher than the upper limit value, it is possible to correct the aberration in the second lens group because aberration caused in the first lens group can be controlled.

In the zoom lens stated above, it is preferable that the following condition is satisfied.

$$0.64 \leq f_W/D \leq 1.0 \tag{15}$$

$$0.50 \leq |f_{RC}|/f_W \leq 0.85 \tag{16}$$

wherein $f_W$: Focal length at a wide angle end
D: Length of a diagonal line of an image plane
$f_{RC}$: Focal length of the second lens group In the zoom lens stated above, it is preferable that the following condition is satisfied.

$$-6 \leq (\phi P_{FC} + \phi P_{RC}) \cdot f_r^2/F_r \leq 6 \tag{23}$$

wherein $\phi P_{FC}$: The sum of powers of plastic lenses in the first lens group
$\phi P_{RC}$: The sum of powers of plastic lenses in the second lens group
$f_r$: Focal length at telephoto end
$F_r$: F-number at a telephoto end In the zoom lens group stated above, it is preferable that the first lens having positive refracting power is arranged to be closest to an object in the first lens group, and the following condition is satisfied.

$$2.8 \leq f_{1\text{-}1}/f_{FC} \leq 7.0 \tag{20}$$

wherein $f_{1\text{-}1}$: Focal length of (1-1)th lens
$f_{FC}$: Focal length of the first lens group In a 2-group zoom lens composed of the first lens group having positive refracting power and the second lens group having negative refracting power, it is preferable that two or more plastic lenses are included, and refractive index of all of the included plastic lenses is 1.5 or more.

When the refractive index is made to be high as in the invention, by using the materials stated above, there are obtained effects that a radius of curvature of the lens can be made great, sensitivity for eccentricity is made to be small, and lens-forming is easy.

In the zoom lens stated above, it is preferable that the following condition is satisfied.

$$3 \leq f_r/F_{FC} \leq 6 \tag{26}$$

wherein $f_r$: Focal length at telephoto end
$f_{FC}$: Focal length of the first lens group In the zoom lens stated above, it is preferable that the following condition is satisfied.

$$0.64 \leq f_W/D \leq 1.0 \tag{15}$$

$$0.50 \leq |f_{RC}|/f_W \leq 0.85 \tag{16}$$

wherein $f_W$: Focal length at a wide angle end
D: Length of a diagonal line of an image plane
$f_{RC}$: Focal length of the second lens group In the zoom lens stated above, it is preferable that the following condition is satisfied.

$$-6 \leq (\phi P_{FC} + \phi P_{RC}) \cdot f_r^2/F_r \leq 6 \tag{23}$$

wherein $\phi P_{FC}$: The sum of powers of plastic lenses in the first lens group
$\phi P_{RC}$: The sum of powers of plastic lenses in the second lens group
$f_r$: Focal length at telephoto end
$F_r$: F-number at a telephoto end It is characterized that (1-1)th lens having positive refracting power is arranged to be closest to an object in the first lens group, and the following condition is satisfied.

$$2.8 \leq f_{1\text{-}1}/f_{FC} \leq 7.0 \tag{20}$$

wherein $f_1$: Focal length of (1-1)th lens
$f_{FC}$: Focal length of the first lens group

EXAMPLES

There will be shown as follows the examples of the zoom lens of the invention to which the invention is not limited. Symbols used in each example are as follows.

F: F-number
ω: Half field angle
r. Radius of curvature on the surface of refraction
d. Distance between surfaces of refraction
$N_d$: Refractive index of lens material for d ray
$v_d$: Abbe's number of lens material
f. Focal length
$f_b$: Back focus With regard to a form of an aspherical surface in each example, an X axis is taken in the direction of an optical axis, height h is taken in the direction perpendicular to the optical axis, and K, $A_4$, $A_6$, $A_8$, $A_{10}$, and $A_{12}$ are shown in the expression as an aspherical surface coefficient.

$$x = \frac{h^2/r}{1 + \sqrt{1 - (K+1)h^2/r^2}} + A_4 h^4 + A_6 h^6 + A_8 h^8 + A_{10} h^{10} + A_{12} h^{12}$$

Example 1

Example 1 is one included in Structures (1-1) to (1-3) and (1-7) to (1-9). FIG. 1 is a sectional view of a lens of Example 1. Lens data are shown in Table 1 and Table 2.

TABLE 1

| f = 39.50–86.60 | | F = 4.93–10.81 | |
| $f_b$ = 8.77–52.94 | | 2ω = 56.3° –28.2° | |
| Surface number | r (mm) | d (mm) | $N_d$ | $v_d$ |
| --- | --- | --- | --- | --- |
| 1* | 22.788 | 1.70 | 1.49700 | 56.0 |
| 2* | 28.834 | 2.70 | | |
| 3 | 29.890 | 1.20 | 1.80518 | 25.4 |
| 4 | 16.019 | 5.70 | | |
| 5 | 39.063 | 3.20 | 1.51823 | 59.0 |
| 6 | −14.401 | Variable interval | | |
| 7* | −133.000 | 2.00 | 1.49700 | 56.0 |
| 8* | −133.664 | 8.00 | | |
| 9 | −10.939 | 1.10 | 1.74320 | 49.3 |
| 10 | −24.956 | | | |

TABLE 1-continued

Variable interval

| f | 39.50 | 58.52 | 86.60 |
|---|---|---|---|
| $d_6$ | 13.99 | 7.60 | 3.30 |

Diaphragm to be provided at the position behind the sixth surface by 0.8 mm
* Aspherical surface

TABLE 2

| Surface number | Aspherical surface coefficient |
|---|---|
| 1st surface | $K = 1.95400 \times 10^0$ |
| | $A_4 = -8.54140 \times 10^{-5}$ |
| | $A_6 = -5.58340 \times 10^{-7}$ |
| | $A_8 = 5.02200 \times 10^{-9}$ |
| | $A_{10} = -5.28750 \times 10^{-11}$ |
| 2nd surface | $K = 1.04960 \times 10^1$ |
| | $A_4 = -3.56290 \times 10^{-5}$ |
| | $A_6 = -5.14370 \times 10^{-7}$ |
| | $A_8 = 1.26240 \times 10^{-8}$ |
| | $A_{10} = -2.05480 \times 10^{-10}$ |
| 7th surface | $K = 0.0$ |
| | $A_4 = 6.22590 \times 10^{-5}$ |
| | $A_6 = 1.38840 \times 10^{-6}$ |
| | $A_8 = -2.54280 \times 10^{-8}$ |
| | $A_{10} = 1.94740 \times 10^{-10}$ |
| 8th surface | $K = 0.0$ |
| | $A_4 = 1.10760 \times 10^{-4}$ |
| | $A_6 = 1.20350 \times 10^{-6}$ |
| | $A_8 = -2.21190 \times 10^{-8}$ |
| | $A_{10} = 1.51240 \times 10^{-10}$ |

Figure 2:
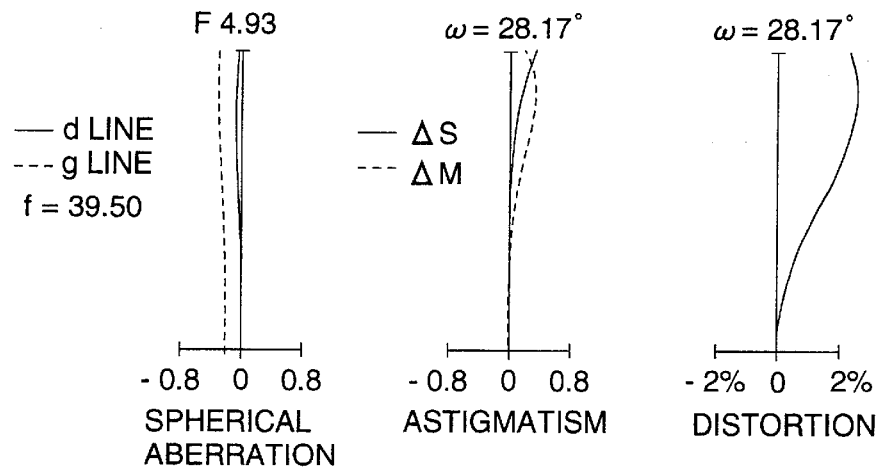
FIGS. 2(A) to 2(C) are diagrams of lens aberrations.
Figure 2:
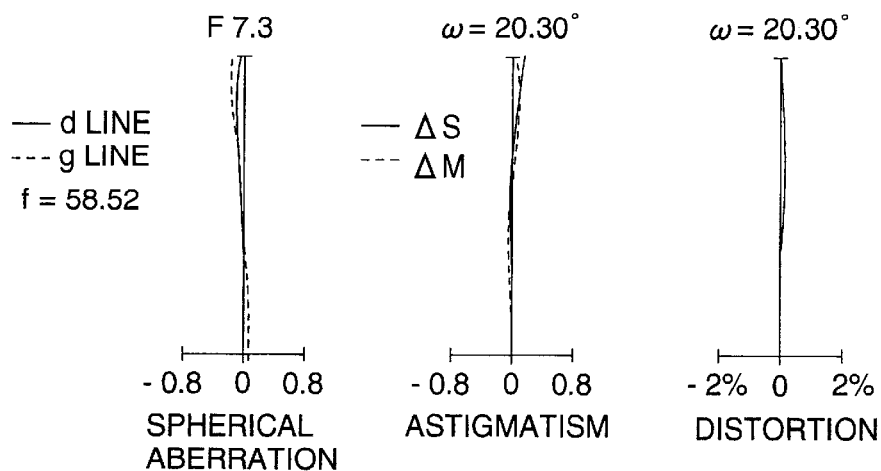
Figure 2:
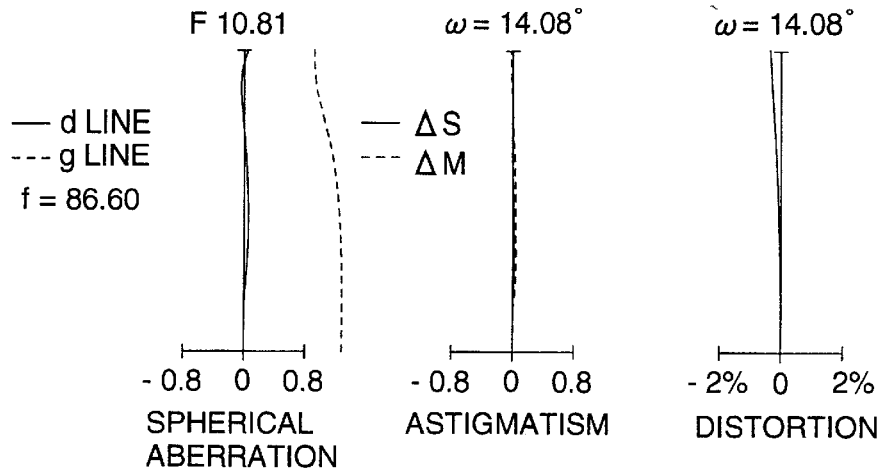

First lens group LG1 is composed of the first plastic lens having positive refracting power, the second glass lens having negative refracting power and the third glass lens having positive refracting power, while, second lens group LG2 is composed of the fourth plastic lens which hardly has power and the fifth glass lens having negative refracting power. FIG. 2 is a diagram for lens aberrations at (A) short focal point end, (B) medium point and (C) long focal point end in Example 1.

Example 2

Figure 3:
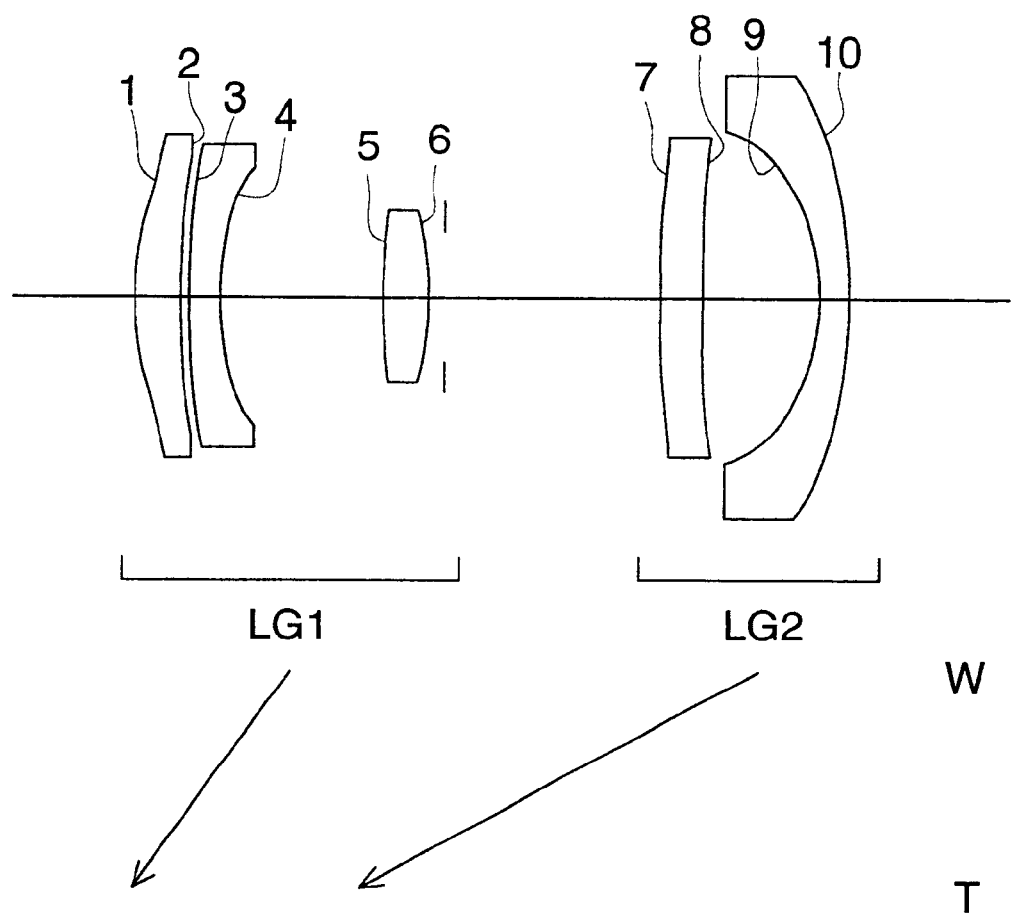
FIG. 3 is a sectional view of a lens in Example 2.

FIG. 3 is a sectional view of the lens in Example 2.

TABLE 3

| f = 36.01–68.20 | | F = 5.28–10.0 | |
|---|---|---|---|
| $f_b$ = 7.85–39.26 | | $2\omega = 60.2°–35.4°$ | |

| Surface number | r (mm) | d (mm) | $N_d$ | $\nu_d$ |
|---|---|---|---|---|
| 1* | 16.543 | 2.30 | 1.49700 | 56.0 |
| 2* | 29.724 | 0.50 | | |
| 3 | 42.874 | 1.50 | 1.58300 | 30.0 |
| 4* | 15.582 | 8.41 | | |
| 5 | 40.583 | 2.20 | 1.48749 | 70.2 |
| 6 | −14.031 | Variable interval | | |
| 7* | −110.943 | 2.20 | 1.49700 | 56.0 |
| 8* | −112.992 | 6.01 | | |
| 9 | −9.884 | 1.50 | 1.72000 | 50.2 |
| 10 | −22.579 | | | |

TABLE 3-continued

Variable interval

| f | 36.01 | 50.05 | 68.20 |
|---|---|---|---|
| $d_6$ | 12.02 | 6.84 | 3.30 |

Diaphragm to be provided at the position behind the sixth surface by 0.8 mm
* Aspherical surface

TABLE 4

| Surface number | Aspherical surface coefficient |
|---|---|
| 1st surface | $K = 1.7913$ |
| | $A_4 = -8.9498 \times 10^{-5}$ |
| | $A_6 = -9.3542 \times 10^{-7}$ |
| | $A_8 = -8.8100 \times 10^{-9}$ |
| | $A_{10} = -9.37359 \times 10^{-11}$ |
| 2nd surface | $K = 9.0873$ |
| | $A_4 = -8.1944 \times 10^{-5}$ |
| | $A_6 = -1.8885 \times 10^{-6}$ |
| | $A_8 = 1.0263 \times 10^{-8}$ |
| | $A_{10} = -1.4367 \times 10^{-10}$ |
| 4th surface | $K = 2.6630$ |
| | $A_4 = 1.9440 \times 10^{-6}$ |
| | $A_6 = 1.3766 \times 10^{-6}$ |
| | $A_8 = -2.6583 \times 10^{-8}$ |
| | $A_{10} = -7.0074 \times 10^{-11}$ |
| 7th surface | $K = 1.5085 \times 10^2$ |
| | $A_4 = 1.3695 \times 10^{-4}$ |
| | $A_6 = 1.7691 \times 10^{-6}$ |
| | $A_8 = -1.7411 \times 10^{-8}$ |
| | $A_{10} = 2.0501 \times 10^{-10}$ |
| | $A_{12} = -2.0516 \times 10^{-13}$ |
| 8th surface | $K = -1.0351 \times 10^3$ |
| | $A_4 = -9.1505 \times 10^{-6}$ |
| | $A_6 = 2.5656 \times 10^{-6}$ |
| | $A_8 = -2.4580 \times 10^{-8}$ |
| | $A_{10} = 1.4796 \times 10^{-10}$ |
| | $A_{12} = 7.2149 \times 10^{-13}$ |

Figure 4:
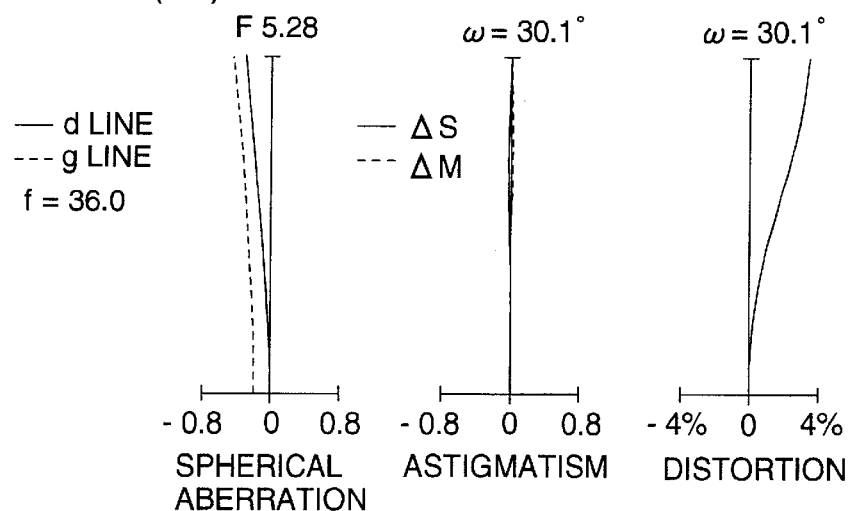
FIGS. 4(A) to 4(C) are diagrams of lens aberrations.
Figure 4:
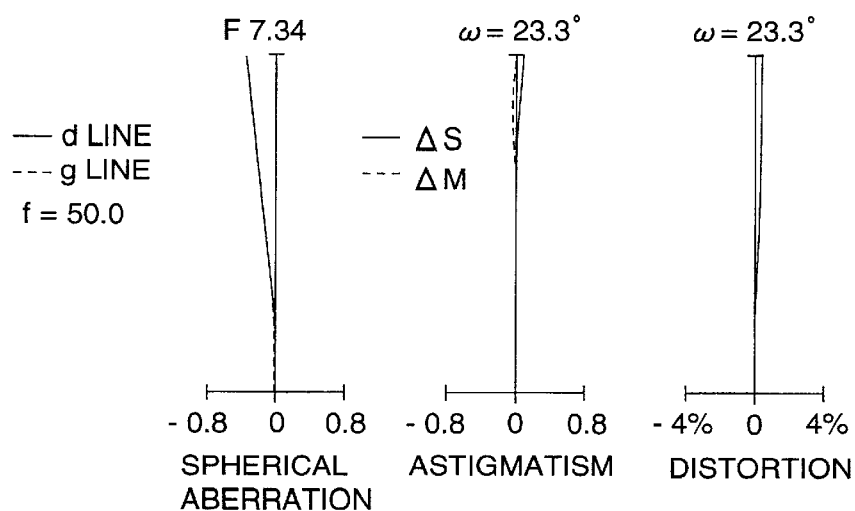
Figure 4:
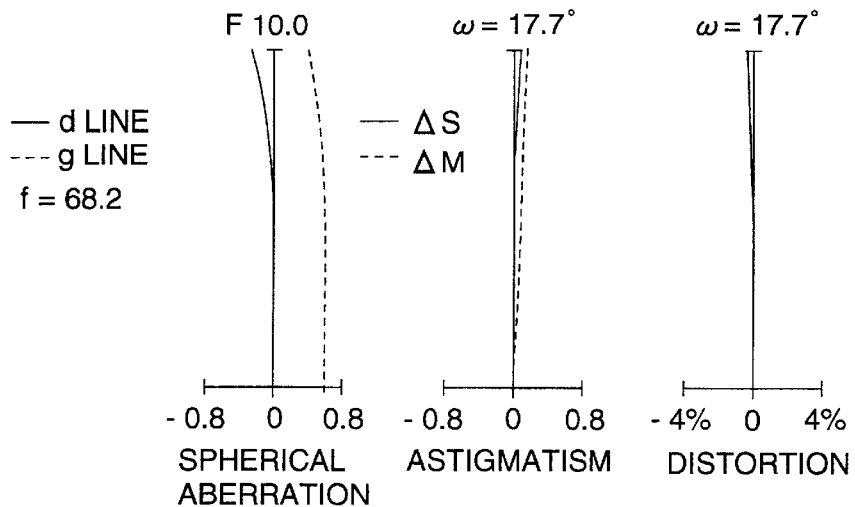

First lens group LG1 is composed of the first plastic lens having positive refracting power, the second plastic lens having negative refracting power and the third glass lens having positive refractive power, while, second lens group LG2 is composed of the fourth plastic lens which hardly has power and fifth glass lens having negative refracting power. FIG. 4 is a diagram for lens aberrations at (A) short focal point end, (B) medium point and (C) long focal point in Example 2.

Example 3

Figure 5:
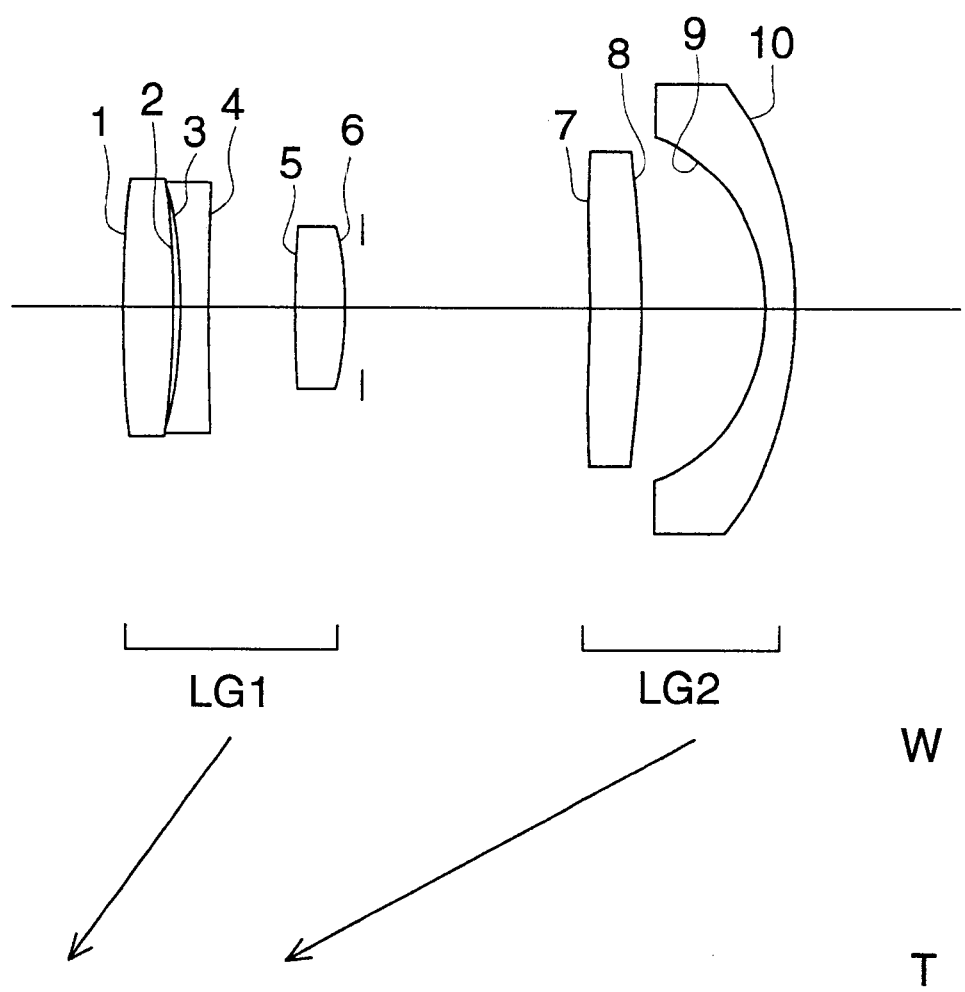
FIG. 5 is a sectional view of a lens in Example 3.

Example 3 is one included in Structures (1-4), (1-5), (1-7), (1-8) and (1-9). FIG. 5 is a sectional view of a lens of Example 3. Lens data are shown in Table 5 and Table 6.

TABLE 5

| f = 36.50–67.50 | | F = 5.57–10.3 | |
|---|---|---|---|
| $f_b$ = 8.08–39.70 | | $2\omega = 60.0°–35.4°$ | |

| Surface number | r (mm) | d (mm) | $N_d$ | $\nu_d$ |
|---|---|---|---|---|
| 1* | 44.770 | 2.50 | 1.52500 | 56.0 |
| 2 | −48.668 | 0.35 | | |
| 3 | −23.858 | 1.50 | 1.58300 | 30.0 |
| 4* | 190.892 | 4.20 | | |
| 5 | 101.042 | 2.50 | 1.51633 | 64.1 |
| 6 | −13.799 | Variable interval | | |

TABLE 5-continued

| 7* | −63.191 | 2.50 | 1.49700 | 56.0 |
| 8* | −64.448 | 6.24 | | |
| 9 | −9.549 | 1.50 | 1.69680 | 55.5 |
| 10 | −20.316 | | | |

| Variable interval | | | |
|---|---|---|---|
| f | 36.50 | 49.60 | 67.50 |
| $d_6$ | 12.31 | 7.13 | 3.30 |

Diaphragm to be provided at the position behind the sixth surface by 0.8 mm
* Aspherical surface

TABLE 6

| Surface number | Aspherical surface coefficient |
|---|---|
| 1st surface | $K = -9.99238 \times 10^1$ |
| | $A_4 = 3.80295 \times 10^{-5}$ |
| | $A_6 = -1.93720 \times 10^{-6}$ |
| | $A_8 = 2.70973 \times 10^{-8}$ |
| | $A_{10} = -2.32908 \times 10^{-10}$ |
| 4th surface | $K = 4.18123 \times 10^2$ |
| | $A_4 = -3.50573 \times 10^{-5}$ |
| | $A_6 = 2.29666 \times 10^{-6}$ |
| | $A_8 = -2.55234 \times 10^{-8}$ |
| | $A_{10} = 1.76102 \times 10^{-10}$ |
| 7th surface | $K = 5.26340 \times 10^1$ |
| | $A_4 = 9.69222 \times 10^{-5}$ |
| | $A_6 = 1.24697 \times 10^{-6}$ |
| | $A_8 = -2.05866 \times 10^{-8}$ |
| | $A_{10} = 3.11881 \times 10^{-10}$ |
| 8th surface | $K = -2.34329 \times 10^1$ |
| | $A_4 = -2.39101 \times 10^{-6}$ |
| | $A_6 = 3.61704 \times 10^{-7}$ |
| | $A_8 = -1.52093 \times 10^{-8}$ |
| | $A_{10} = 1.43974 \times 10^{-10}$ |

Figure 6:
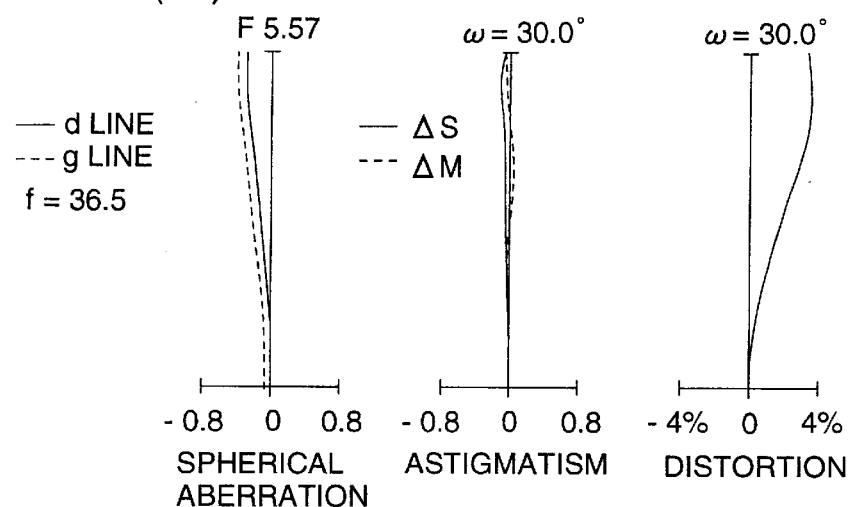
FIGS. 6(A) to 6(C) are diagrams of lens aberrations.
Figure 6:
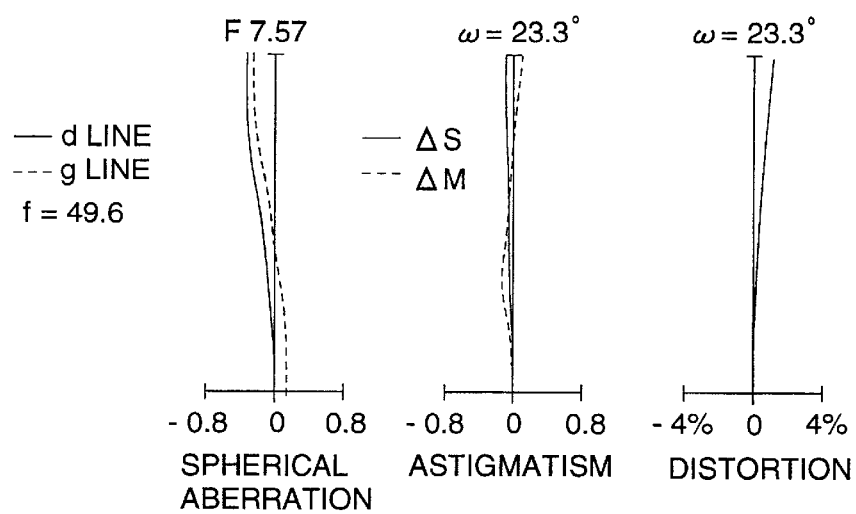
Figure 6:
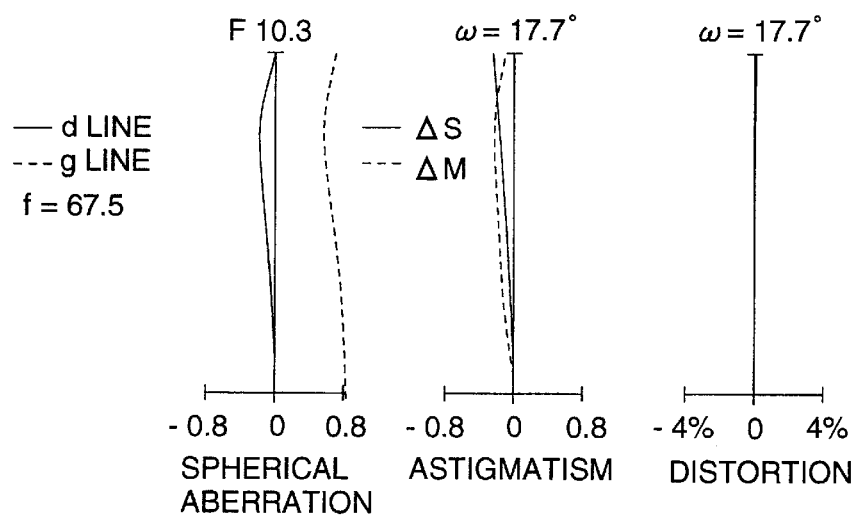
Figure 7:
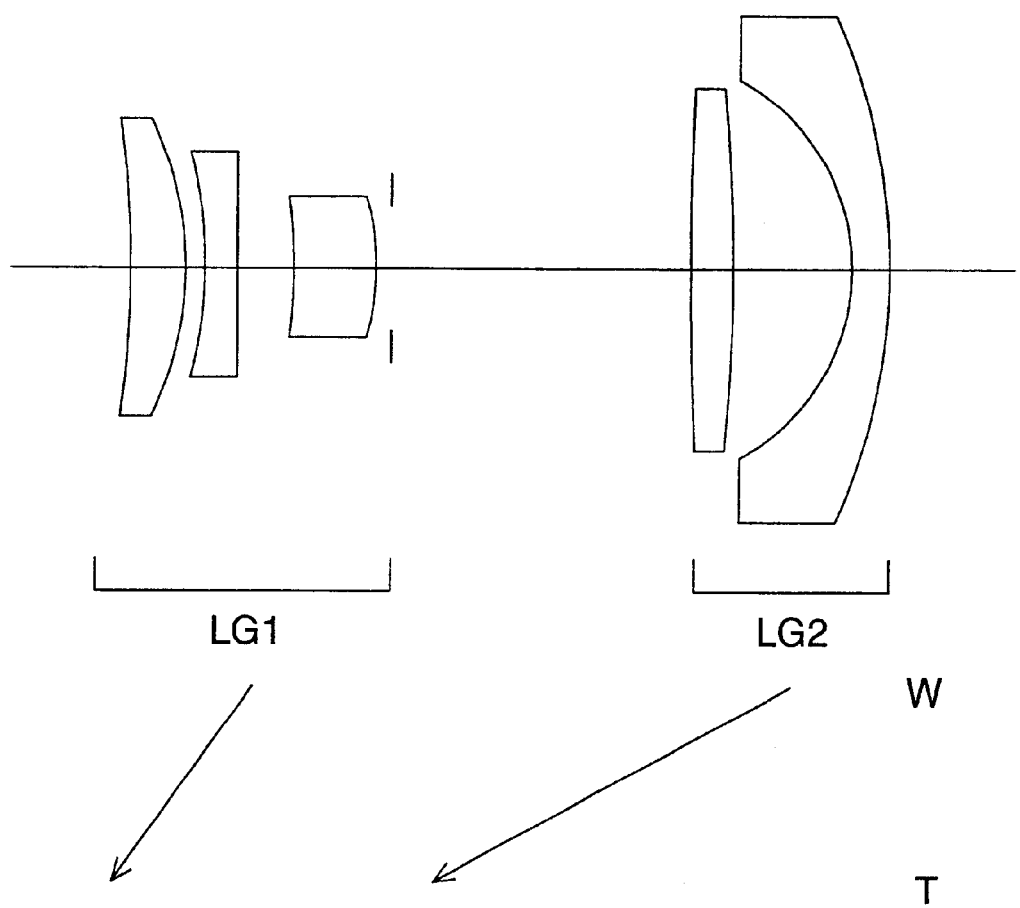
FIG. 7 is a sectional view of a lens in Example 4.
Figure 8:
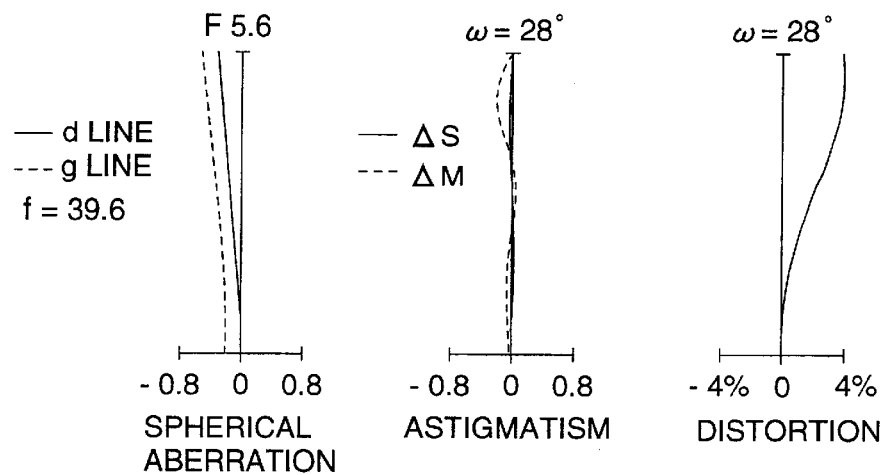
FIGS. 8(A) to 8(C) are diagrams of lens aberrations.
Figure 8:
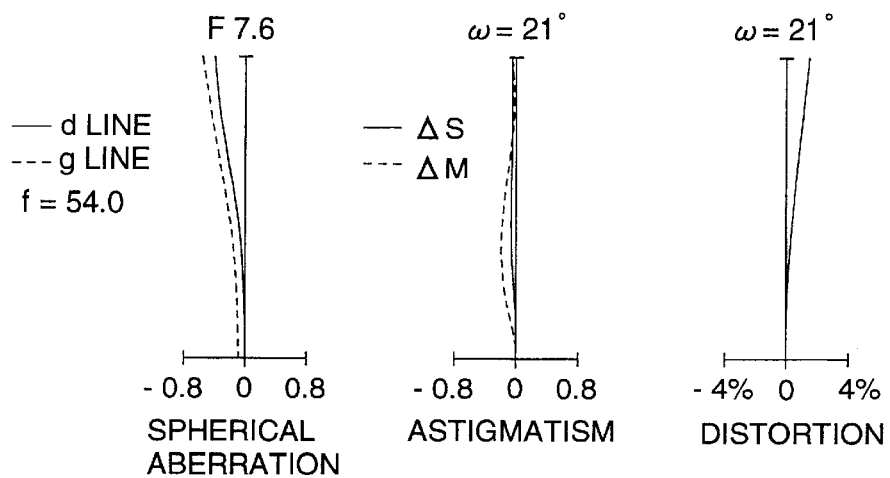
Figure 8:
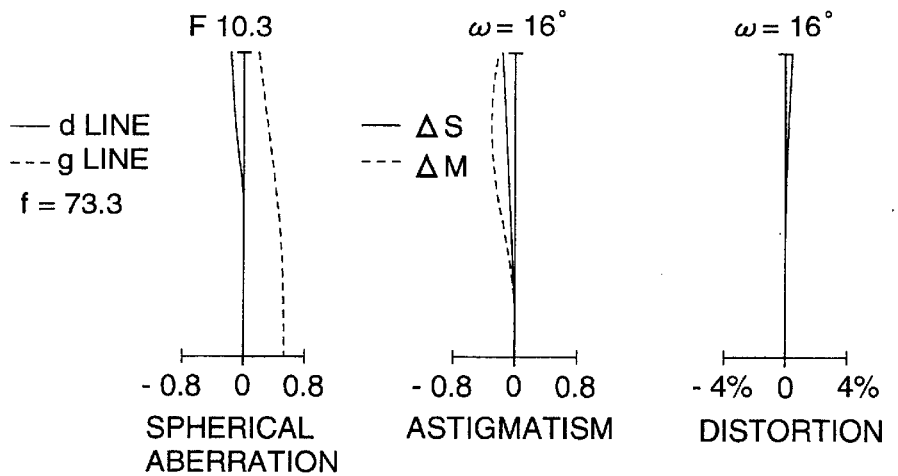
Figure 9:
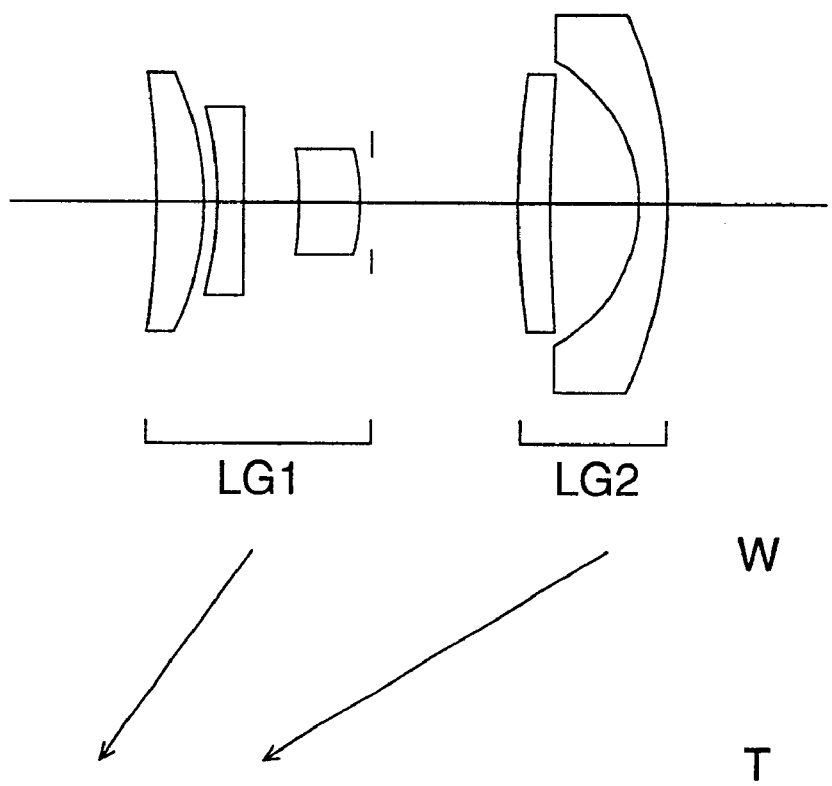
FIG. 9 is a sectional view of a lens in Example 5.
Figure 10:
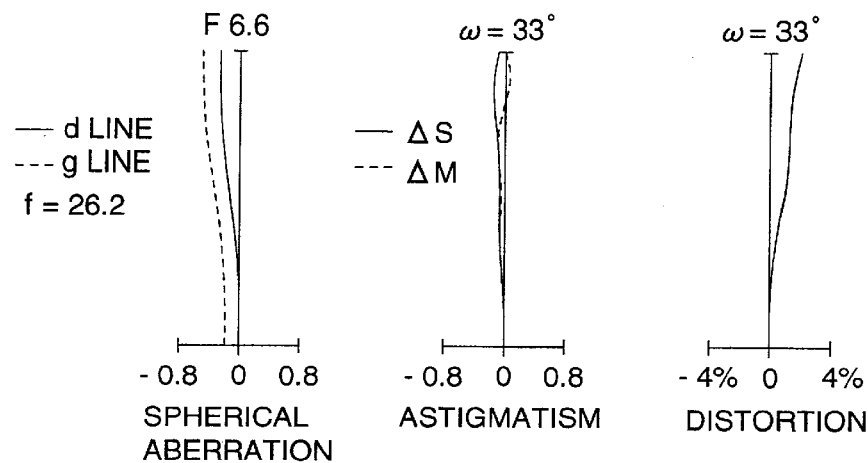
FIGS. 10(A) to 10(C) are diagrams of lens aberrations.
Figure 10:
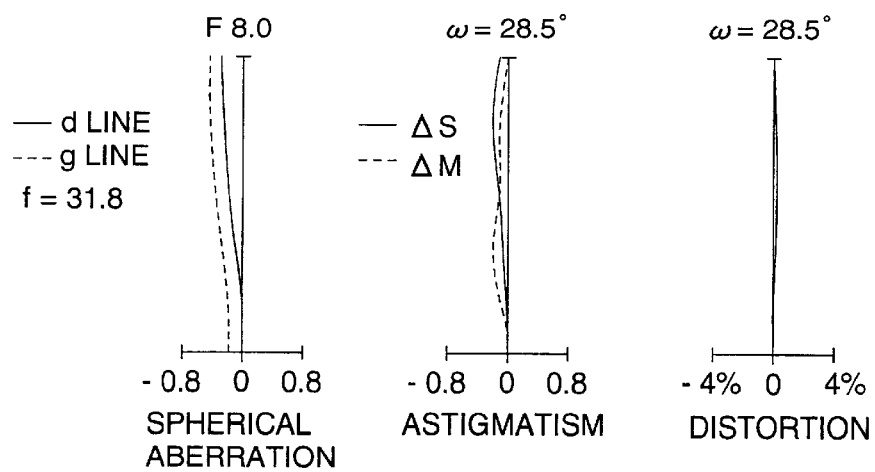
Figure 10:
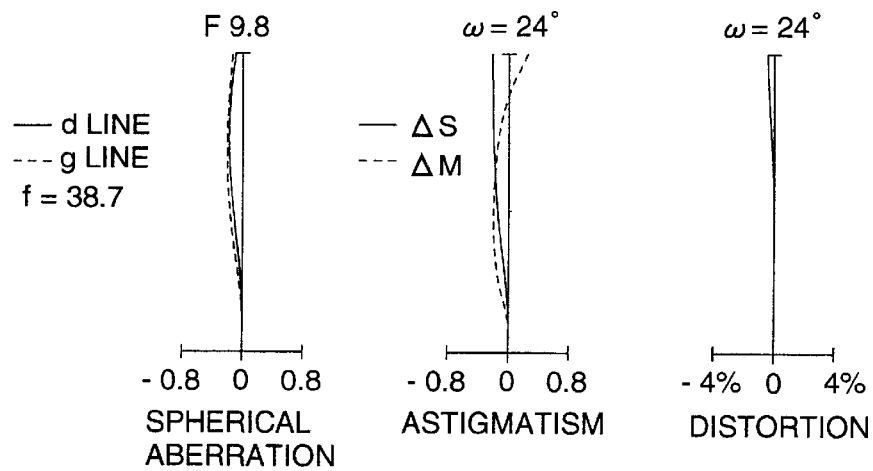

First lens group LG1 is composed of the first plastic lens having positive refracting power, the second plastic lens having negative refracting power and the third glass lens having positive refracting power, while, second lens group LG2 is composed of the fourth plastic lens which hardly has power and the fifth glass lens having negative refracting power. FIG. 6 is a diagram for lens aberrations at (A) short focal point end, (B) medium point and (C) long focal point end in Example 3.

Now, values of each conditional expression in each example are shown in Table 7 and Table 8.

TABLE 7

| Conditional expression | Example 1 |
|---|---|
| $n_3$ | 1.52 |
| $n_5$ | 1.74 |
| $f_w/D$ | 0.91 |
| $|f_{RC}|/f_w$ | 0.68 |
| $(\phi_P + \phi_4) \cdot f_T^2/F_T$ | 3.47 |

TABLE 8

| Conditional expression | Example 2 |
|---|---|
| $n_5$ | 1.72 |
| $f_w/D$ | 0.83 |
| $|f_{RC}|/f_w$ | 0.71 |
| $(\phi_1 + \phi_2 + \phi_4) \cdot f_T^2/F_T$ | −4.32 |

TABLE 8-continued

| Conditional expression | Example 3 |
|---|---|
| $n_3$ | 1.52 |
| $n_5$ | 1.70 |
| $f_w/D$ | 0.84 |
| $|f_{RC}|/f_w$ | 0.74 |
| $(\phi_1 + \phi_2 + \phi_4) \cdot f_T^2/F_T$ | −2.34 |

As shown in Table 7 and Table 8, the conditional expressions of the invention are respectively satisfied. Further, in each example, it is understood that spherical aberration, astigmatism and distortion are satisfactorily corrected for both telephoto and wide angle as shown in FIG. 42.

There will be shown as follows, other examples of a zoom lens of the invention, to which the invention is not limited. Symbols used commonly for each example are as follows.

F: F-number
ω: Half field angle
r. Radius of curvature on the surface of refraction
d. Distance between surfaces of refraction
$N_d$: Refractive index of lens material for d ray
$v_d$: Abbe's number of lens material
f. Focal length
$f_b$: Back focus A lens which is given a mark of * in each table represents a plastic lens.

With regard to a form of an aspherical surface in each example, an X axis is taken in the direction of an optical axis, height h is taken in the direction perpendicular to the optical axis, and K, $A_4$, $A_6$, $A_8$, $A_{10}$ and $A_{12}$ are shown in the expression as an aspherical surface coefficient.

$$x = \frac{h^2/r}{1 + \sqrt{1 - (K+1)h^2/r^2}} + A_4 h^4 + A_6 h^6 + A_8 h^8 + A_{10} h^{10} + A_{12} h^{12}$$

Example 4

TABLE 9

| f = 39.60–73.30 | | F = 5.6–10.3 | |
|---|---|---|---|
| $f_b$ = 6.66–45.67 | | 2ω = 56°–32° | |

| Surface number | r (mm) | d (mm) | $N_d$ | $v_d$ | |
|---|---|---|---|---|---|
| 1* | 1805.078 | 3.00 | 1.52500 | 56.0 | plastic polyolefin type |
| 2 | −17.348 | 1.00 | | | |
| 3 | −22.352 | 1.80 | 1.58300 | 30.0 | plastic polycarbonate type |
| 4* | −5313.280 | 2.94 | | | |
| 5 | −28.210 | 4.50 | 1.62299 | 58.2 | glass |
| 6 | −13.081 | Variable interval | | | |
| 7* | −72.830 | 2.20 | 1.52500 | 56.0 | plastic polyolefin type |
| 8* | −73.738 | 6.60 | | | |
| 9 | −11.700 | 2.00 | 1.52500 | 56.0 | plastic polyolefin type |
| 10 | −31.130 | | | | |

TABLE 9-continued

Variable interval

| f | 36.60 | 54.01 | 73.30 |
|---|---|---|---|
| $d_6$ | 17.25 | 9.44 | 3.80 |

Diaphragm to be provided at the position behind the sixth surface by 0.8 mm
• Aspherical surface

TABLE 10

| Surface number | Aspherical surface coefficient |
|---|---|
| 1st surface | $K = -5.5079 \times 10^{+5}$ |
| | $A_4 = -1.2975 \times 10^{-4}$ |
| | $A_6 = -2.8581 \times 10^{-7}$ |
| | $A_8 = 3.0098 \times 10^{-9}$ |
| | $A_{10} = -6.8519 \times 10^{-12}$ |
| 4th surface | $K = 2.5669$ |
| | $A_4 = 6.3834 \times 10^{-5}$ |
| | $A_6 = -8.1136 \times 10^{-7}$ |
| | $A_8 = 6.3021 \times 10^{-9}$ |
| | $A_{10} = -6.3671 \times 10^{-11}$ |
| 7th surface | $K = 4.8682 \times 10^{+1}$ |
| | $A_4 = 5.6343 \times 10^{-5}$ |
| | $A_6 = 2.0704 \times 10^{-6}$ |
| | $A_8 = -3.5854 \times 10^{-8}$ |
| | $A_{10} = = 2.2264 \times 10^{-10}$ |
| 8th surface | $K = 2.3907 \times 10^{+2}$ |
| | $A_4 = -6.1612 \times 10^{-5}$ |
| | $A_6 = 2.7406 \times 10^{-6}$ |
| | $A_8 = -3.9821 \times 10^{-8}$ |
| | $A_{10} = = 1.9414 \times 10^{-10}$ |

Example 5

TABLE 11

| f = 26.20–38.70 | | | F = 6.6–9.8 | |
|---|---|---|---|---|
| $f_b$ = 7.41–21.98 | | | 2ω = 66°–48° | |

| Surface number | r (mm) | d (mm) | $N_d$ | $v_d$ | |
|---|---|---|---|---|---|
| 1* | −732.167 | 2.20 | 1.52500 | 56.0 | plastic polyolefin type |
| 2 | −15.761 | 0.70 | | | |
| 3 | −12.896 | 1.30 | 1.58300 | 30.0 | plastic polycarbonate type |
| 4* | −41.519 | 2.20 | | | |
| 5 | −44.449 | 2.90 | 1.51633 | 64.1 | glass |
| 6 | −8.028 | Variable interval | | | |
| 7* | 751.029 | 1.50 | 1.49700 | 56.0 | plastic polyolefin type |
| 8* | 100.000 | 4.20 | | | |
| 9 | −6.900 | 1.50 | 1.49700 | 56.0 | plastic polyolefin type |
| 10 | −18.000 | | | | |

Variable interval

| f | 26.20 | 31.80 | 38.70 |
|---|---|---|---|
| $d_6$ | 7.42 | 4.84 | 2.70 |

Diaphragm to be provided at the position behind the sixth surface by 0.7 mm
• Aspherical surface

TABLE 12

| Surface number | Aspherical surface coefficient<z,1/32 |
|---|---|
| 1st surface | $K = -9.5037 \times 10^{-12}$ |
| | $A_4 = -2.6238 \times 10^{-4}$ |
| | $A_6 = 3.4544 \times 10^{-6}$ |
| | $A_8 = 7.6603 \times 10^{-9}$ |
| | $A_{10} = -8.0922 \times 10^{-10}$ |
| 4th surface | $K = -2.4505 \times 10^{+1}$ |
| | $A_4 = -2.2812 \times 10^{-5}$ |
| | $A_6 = 2.2459 \times 10^{-5}$ |
| | $A_8 = -4.825 \times 10^{-7}$ |
| | $A_{10} = 1.0829 \times 10^{-8}$ |
| 7th surface | $K = 2.1139 \times 10^{-12}$ |
| | $A_4 = -1.1103 \times 10^{-4}$ |
| | $A_6 = 2.0763 \times 10^{-5}$ |
| | $A_8 = -3.1092 \times 10^{-7}$ |
| | $A_{10} = 4.1011 \times 10^{-9}$ |
| 8th surface | $K = 2.6289 \times 10^{+2}$ |
| | $A_4 = -2.5268 \times 10^{-4}$ |
| | $A_6 = 1.1220 \times 10^{-5}$ |
| | $A_8 = -1.1891 \times 10^{-7}$ |
| | $A_{10} = 2.4420 \times 10^{-9}$ |

TABLE 13

| Conditional expression | Example 4 | Example 5 |
|---|---|---|
| $n_3$ | 1.623 | 1.516 |
| $n_5$ | 1.525 | 1.497 |
| $f_w/D$ | 0.92 | 0.76 |
| $|f_{RC}|/f_w$ | 0.92 | 0.81 |
| $(r_{a-rb})/(r_a+r_b)$ | 0.37 | 0.69 |
| $(\phi_1 + \phi_2 + \phi P_{RC}/m_T) \cdot f_T^2/F_T$ | −3.70 | −3.05 |

Example 6

Figure 11:
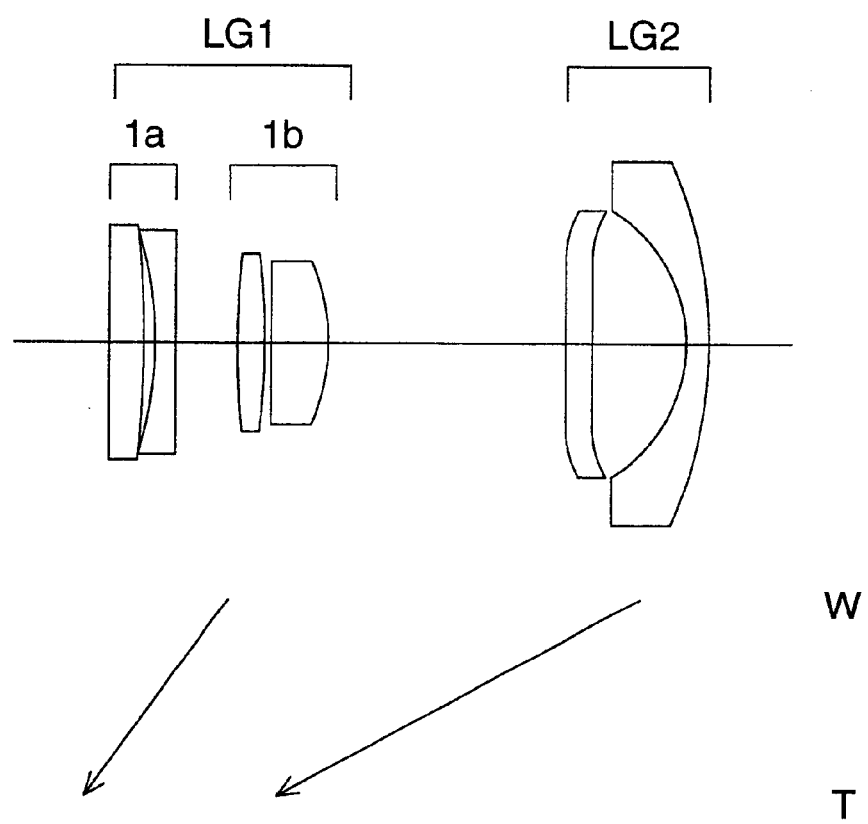
FIG. 11 is a sectional view of a lens in Example 6.

Example 1 is one corresponding to Structures (1-1), (1-10), (1-11), (1-12), (1-13), (1-15) and (1-16). FIG. 11 is a sectional view of the lens in Example 6. Lens data are shown in Table 14 and Table 15.

TABLE 14

| f = 36.50–110.02 | | | F = 3.9–11.8 | |
|---|---|---|---|---|
| $f_b$ = 6.24–76.02 | | | 2ω = 60°–22° | |

| Surface number | r (mm) | d (mm) | $N_d$ | $v_d$ |
|---|---|---|---|---|
| 1 | 617.712 | 2.50 | *1.52500 | 56.0 |
| 2 | −67.789 | 0.80 | | |
| 3 | −25.927 | 1.60 | *1.58300 | 30.0 |
| 4 | 3080.943 | 4.38 | | |
| 5 | 88.877 | 2.00 | *1.52500 | 56.0 |
| 6 | −79.351 | 0.50 | | |
| 7 | 868.646 | 4.04 | 1.51823 | 59.0 |
| 8 | −15.731 | Variable interval | | |
| 9 | −82.342 | 2.20 | *1.52500 | 56.0 |
| 10 | −83.781 | 6.70 | | |
| 11 | −11.200 | 1.50 | 1.71300 | 53.9 |
| 12 | −28.360 | | | |

Variable interval

| f | 36.50 | 60.80 | 110.02 |
|---|---|---|---|
| $d_6$ | 16.90 | 8.71 | 3.20 |

Diaphragm to be provided at the position behind the eighth surface by 0.8 mm
*: Plastic. Other than this is glass

TABLE 15

| Surface number | Aspherical surface coefficient |
|---|---|
| 1st surface | $K = 2.8342 \times 10^{3}$ |
| | $A_4 = -3.3400 \times 10^{-5}$ |
| | $A_6 = 5.7291 \times 10^{-8}$ |
| | $A_8 = 1.6163 \times 10^{-9}$ |
| | $A_{10} = -1.0465 \times 10^{-11}$ |
| 4th surface | $A_4 = 1.5748 \times 10^{-5}$ |
| | $A_6 = 6.9817 \times 10^{-7}$ |
| | $A_8 = -2.9765 \times 10^{-10}$ |
| | $A_{10} = 3.2969 \times 10^{-11}$ |
| 5th surface | $K = -4.4205 \times 10^{1}$ |
| | $A_4 = -2.1628 \times 10^{-5}$ |
| | $A_6 = 4.1061 \times 10^{-7}$ |
| | $A_8 = -1.4205 \times 10^{-8}$ |
| | $A_{10} = 1.9793 \times 10^{-10}$ |
| 9th surface | $K = 0.4056 \times 10^{1}$ |
| | $A_4 = 1.1554 \times 10^{-4}$ |
| | $A_6 = 9.2151 \times 10^{-7}$ |
| | $A_8 = -8.6869 \times 10^{-9}$ |
| | $A_{10} = 8.9755 \times 10^{-11}$ |
| 10th surface | $K = 3.4306 \times 10^{2}$ |
| | $A_4 = -1.5690 \times 10^{-5}$ |
| | $A_6 = 1.9788 \times 10^{-6}$ |
| | $A_8 = -2.3551 \times 10^{-8}$ |
| | $A_{10} = 1.5734 \times 1010^{-10}$ |

Figure 12:
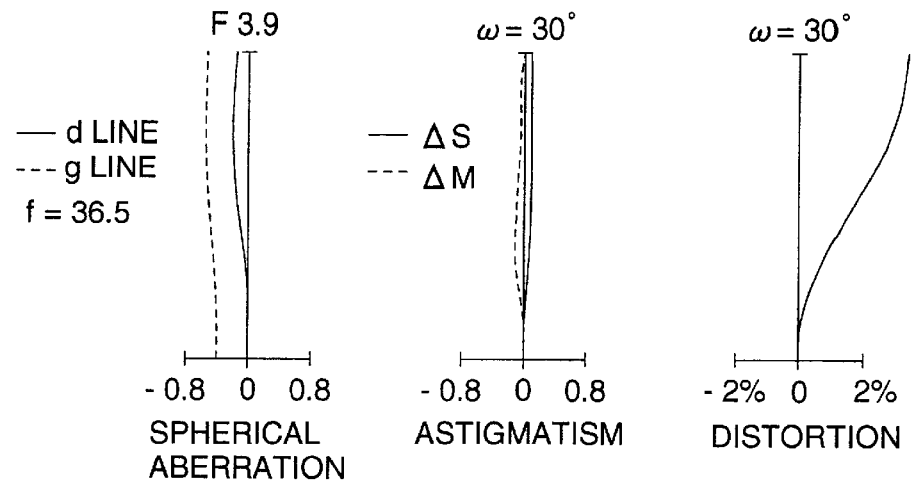
FIGS. 12(A) to 12(C) are diagrams of lens aberrations.
Figure 12:
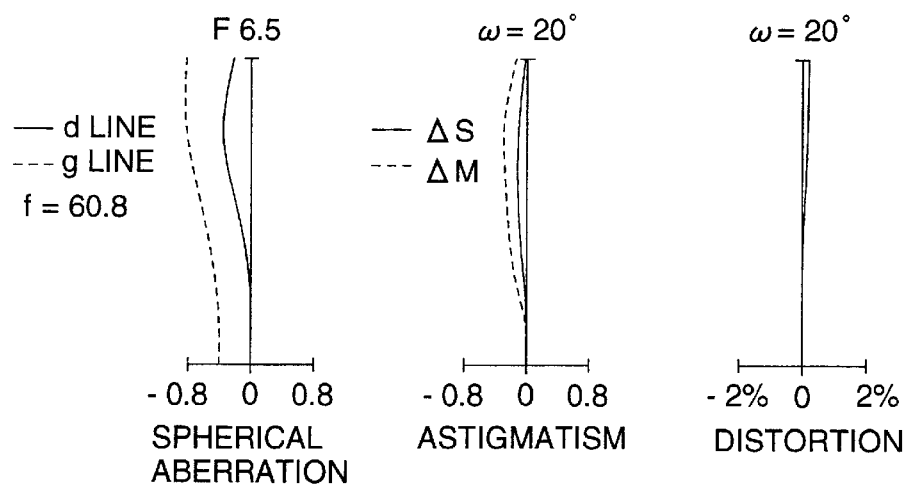
Figure 12:
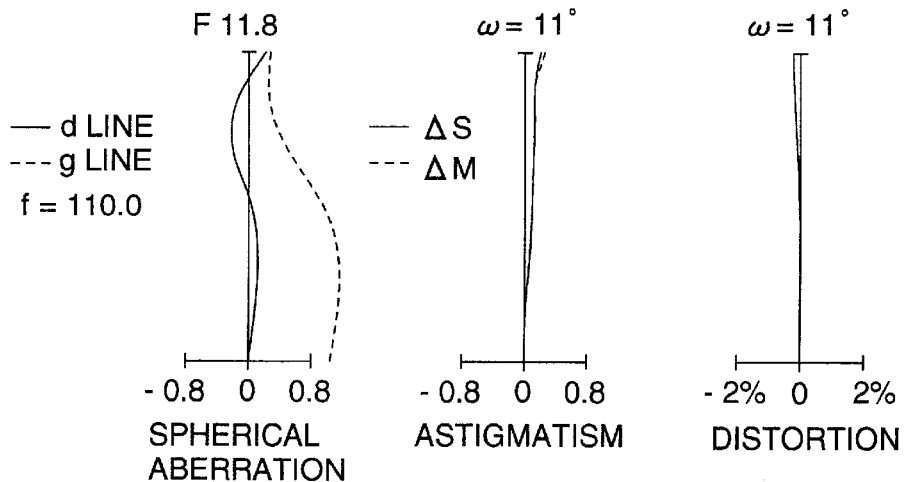

The first lens group GL1 is composed of a first lens having positive refracting power, a second lens having negative refracting power, a third lens having positive refracting power and a fourth lens having positive refracting power all arrange in this order from the object, while, the second lens group GL2 is composed of a fifth lens which hardly has power and a sixth lens having negative refractive power. The first lens, the third lens and the fifth lens represent a polyolefin plastic lens whose saturation water absorption is 0.01%, and the second lens represents a polycarbonate type plastic lens whose saturation water absorption is 0.04%. FIG. 12 is a diagram of lens aberrations at (A) short focal point end, (B) medium point and (C) long focal point end in Example 6.

Example 7

Figure 13:
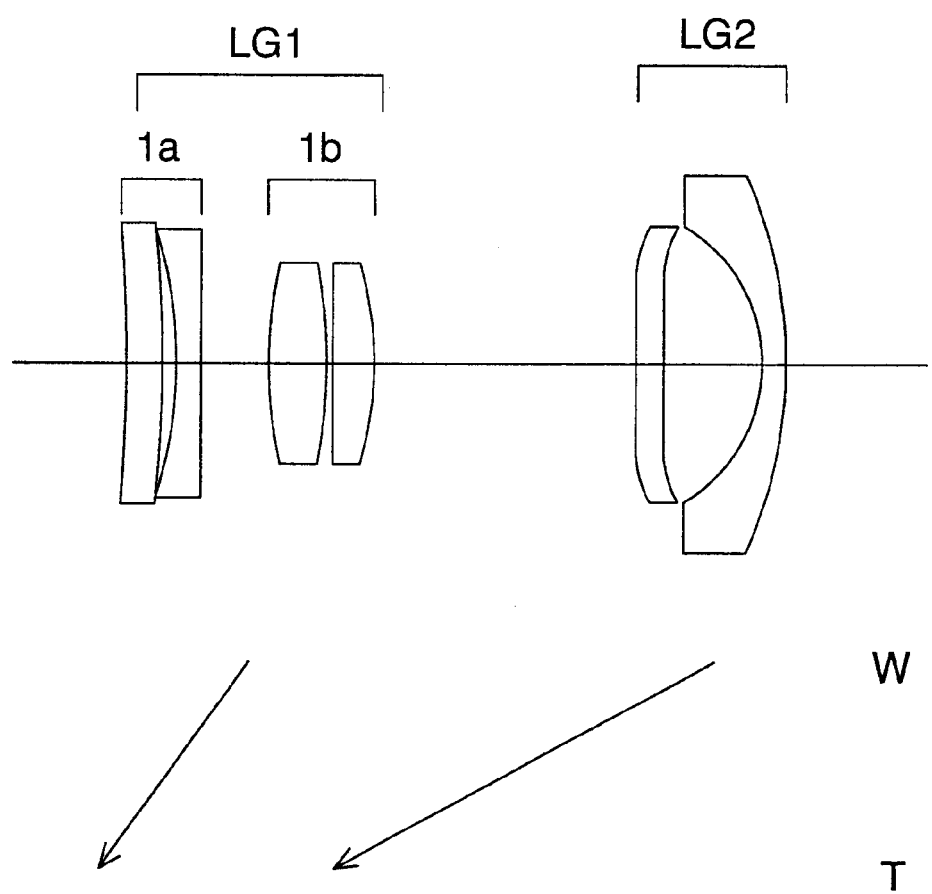
FIG. 13 is a sectional view of a lens in Example 7.

Example 7 is one corresponding to Structures (1-1), (1-10), to (1-13), (1-15) and (1-16). FIG. 13 is a sectional view of a lens in Example 7. Data are shown in Table 16 and Table 17.

TABLE 16

| f = 39.60–120.08 | | F = 3.9–11.8 | |
| fb = 8.19–84.38 | | 2ω = 56°–20° | |

| Surface number | r (mm) | d (mm) | $N_d$ | $V_d$ |
|---|---|---|---|---|
| 1 | 478.411 | 2.50 | *1.52500 | 56.0 |
| 2 | −80.267 | 0.90 | | |
| 3 | −25.519 | 1.60 | *1.58300 | 30.0 |
| 4 | 196.566 | 4.50 | | |
| 5 | 32.633 | 3.50 | 1.50137 | 56.4 |
| 6 | −32.288 | 0.50 | | |
| 7 | −86.372 | 2.50 | *1.52500 | 56.0 |
| 8 | −22.085 | Variable interval | | |
| 9 | −82.716 | 2.20 | *1.52500 | 56.0 |
| 10 | −84.163 | 6.51 | | |
| 11 | −10.995 | 1.50 | 1.69680 | 55.5 |
| 12 | −26.869 | | | |

TABLE 16-continued

| Variable interval | | | |
|---|---|---|---|
| f | 39.60 | 66.30 | 120.08 |
| $d_6$ | 16.74 | 8.62 | 3.23 |

Diaphragm to be provided at the position behind the sixth surface by 0.8 mm
*: Plastic and other than * is glass.

TABLE 17

| Surface number | Aspherical surface coefficient |
|---|---|
| 1st surface | $A4 = -4.8016 \times 10^{-5}$ |
| | $A6 = -2.5221 \times 10^{-7}$ |
| | $A8 = 4.3574 \times 10^{-9}$ |
| | $A10 = -3.9193 \times 10^{-11}$ |
| 4th surface | $A4 = -1.8686 \times 10^{-5}$ |
| | $A6 = 4.2045 \times 10^{-8}$ |
| | $A8 = 6.2129 \times 10^{-9}$ |
| | $A10 = -9.4340 \times 10^{-11}$ |
| 8th surface | $K = -3.3423 \times 10^{1}$ |
| | $A4 = -1.7355 \times 10^{-5}$ |
| | $A6 = 3.2906 \times 10^{-7}$ |
| | $A8 = -8.9883 \times 10^{-9}$ |
| | $A10 = 8.9295 \times 10^{-11}$ |
| 9th surface | $K = 6.9958 \times 10^{1}$ |
| | $A4 = 1.3193 \times 10^{-4}$ |
| | $A6 = 1.1462 \times 10^{-6}$ |
| | $A8 = -1.2949 \times 10^{-8}$ |
| | $A10 = 1.2449 \times 10^{-10}$ |
| 10th surface | $K = -3.9941 \times 10^{2}$ |
| | $A4 = -1.0776 \times 10^{-5}$ |
| | $A6 = 2.3752 \times 10^{-6}$ |
| | $A8 = -2.8387 \times 10^{-8}$ |
| | $A10 = 1.8777 \times 10^{-10}$ |

Figure 14:
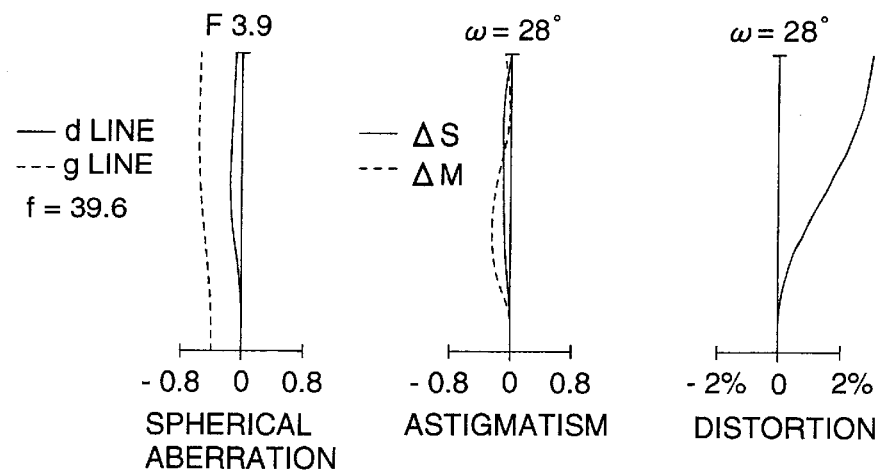
FIGS. 14(A) to 14(C) are diagrams of lens aberrations.
Figure 14:
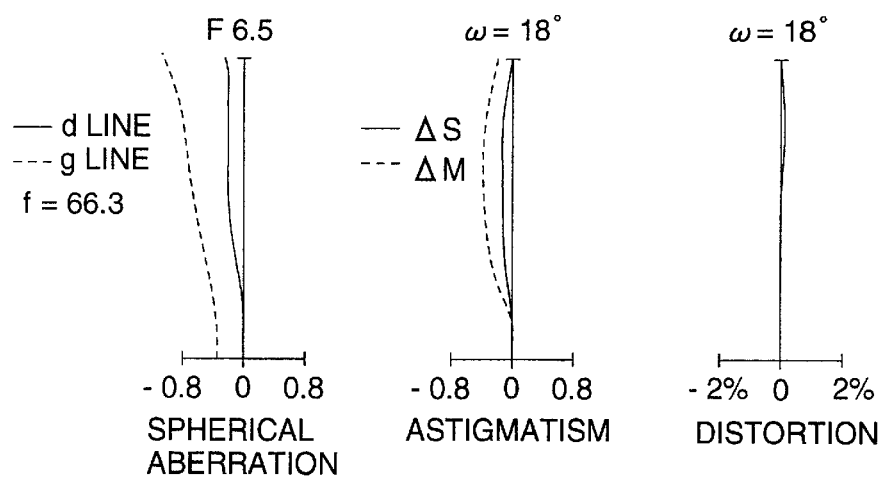
Figure 14:
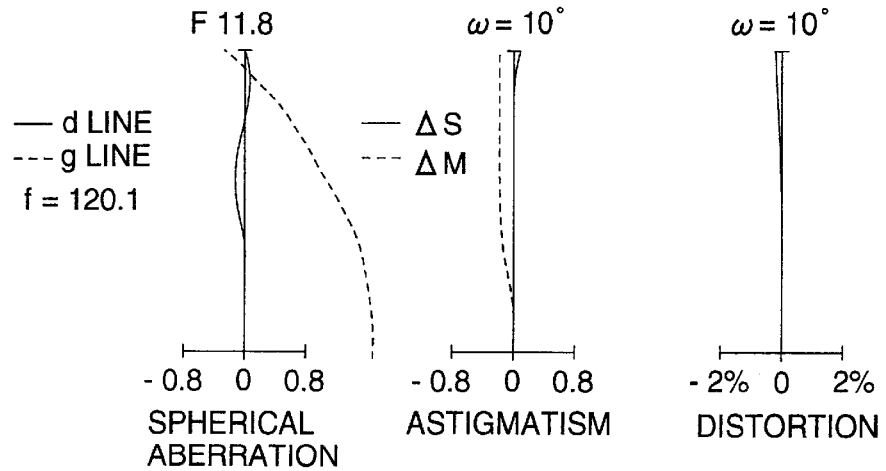

The first lens group GL1 is composed of a first lens having positive refracting power, a second lens having negative refracting power, a third lens having positive refracting power and a fourth lens having positive refracting power all arrange in this order from the object, while, the second lens group GL2 is composed of a fifth lens which hardly has power and a sixth lens having negative refractive power. The first lens, the fourth lens and the fifth lens represent a polyolefin type plastic lens whose saturation water absorption is 0.01%, and the second lens represents a polycarbonate type plastic lens whose saturation water absorption is 0.4%. FIG. 14 is a diagram of lens aberrations at (A) short focal point end, (B) medium point and (C) long focal point end in Example 7.

Example 8

Figure 15:
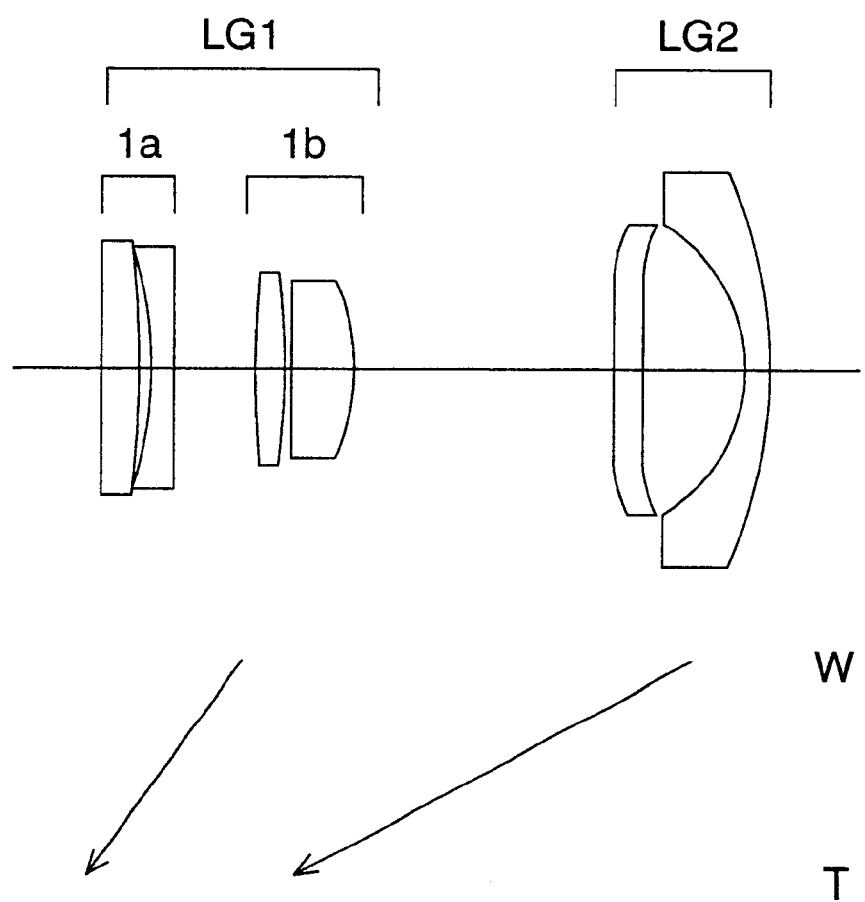
FIG. 15 is a sectional view of a lens in Example 8.
Figure 16:
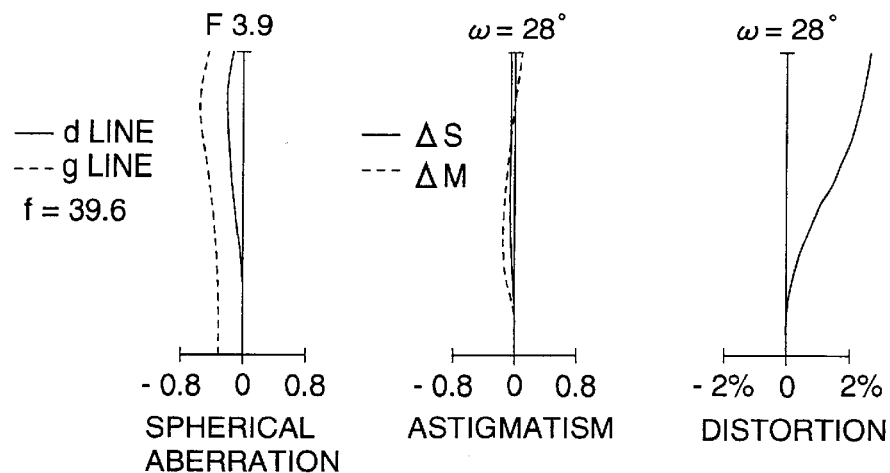
FIGS. 16(A) to 16(C) are diagrams of lens aberrations.
Figure 16:
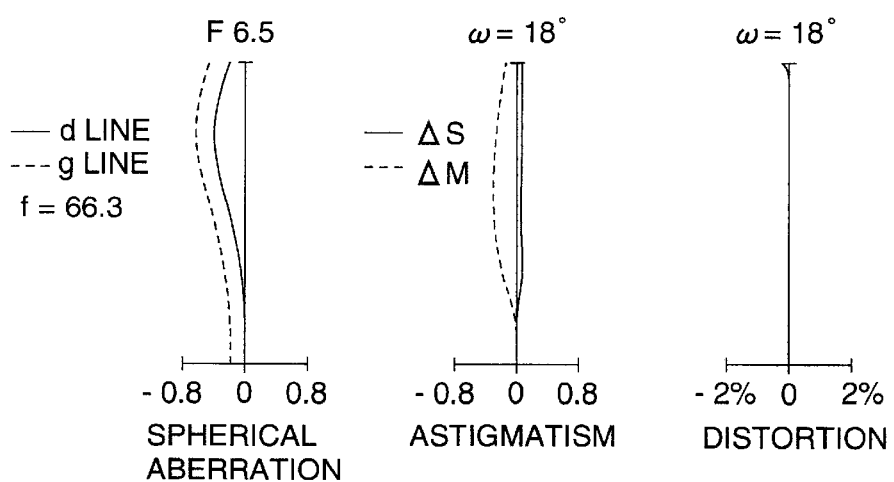
Figure 16:
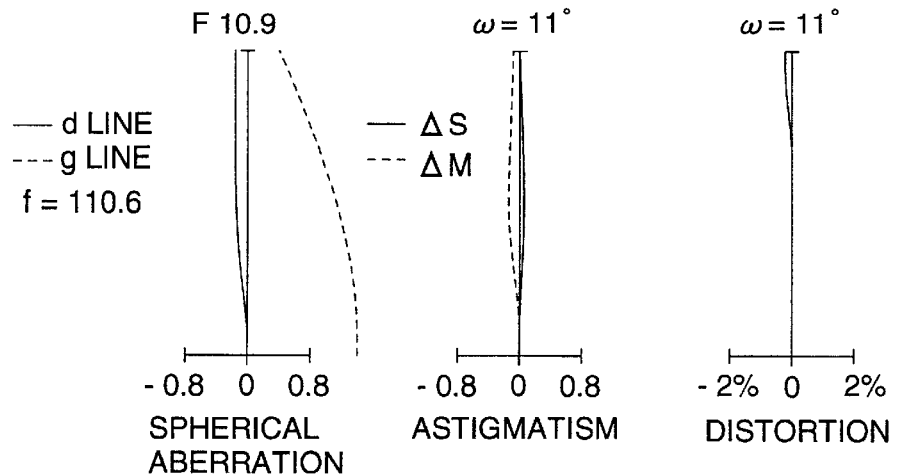

Example 8 is one corresponding to Structures (1-1), (1-10), (1-11), (1-12), (1-14), (1-15) and (1-16). FIG. 15 is a sectional view of a lens in Example 8. Lens data are shown in Table 18 and Table 19.

TABLE 18

| f = 39.60–110.60 | | F = 3.9–11.8 | |
| fb = 8.44–75.68 | | 2ω = 56°–22° | |

| Surface number | r (mm) | d (mm) | $N_d$ | $V_d$ |
|---|---|---|---|---|
| 1* | ∞ | 2.00 | 1.54814 | 45.8 |
| 2 | −90.000 | 1.20 | | |
| 3 | −29.398 | 1.80 | *1.58300 | 30.0 |

TABLE 18-continued

| | | | | |
|---|---|---|---|---|
| 4* | 510.396 | 4.30 | | |
| 5 | 58.160 | 2.40 | *1.52500 | 56.0 |
| 6 | −56.226 | 0.50 | | |
| 7* | −311.813 | 4.50 | 1.48749 | 70.2 |
| 8* | −16.559 | Variable interval | | |
| 9 | −84.055 | 2.20 | *1.52500 | 56.0 |
| 10 | −85.521 | 6.30 | | |
| 11 | −10.986 | 1.50 | 1.69680 | 55.5 |
| 12 | −27.116 | | | |

Variable interval

| | | | |
|---|---|---|---|
| f | 39.60 | 66.30 | 110.60 |
| $d_6$ | 16.53 | 8.54 | 3.80 |

Diaphragm to be provided at the position behind the eighth surface by 0.8 mm
*: Plastic, and other than * is glass.

TABLE 19

| Surface number | Aspherical surface coefficient |
|---|---|
| 3rd surface | K = 9.0599<br>A4 = −1.6122 × 10$^{-4}$<br>A6 = 3.1527 × 10$^{-6}$<br>A8 = −1.4541 × 10$^{-8}$<br>A10 = 8.6405 × 10$^{-11}$ |
| 4th surface | K = −1.9730 × 10$^{4}$<br>A4 = −1.6689 × 10$^{-4}$<br>A6 = 2.6840 × 10$^{-6}$<br>A8 = −1.3752 × 10$^{-9}$<br>A10 = −7.4763 × 10$^{-11}$ |
| 5th surface | K = −4.0104 × 10<br>A4 = −2.5746 × 10$^{-5}$<br>A6 = −9.6321 × 10$^{-8}$<br>A8 = 7.5206 × 10$^{-9}$<br>A10 = −7.6400 × 10$^{-11}$ |
| 9th surface | K = 7.0703 × 10<br>A4 = 1.3157 × 10$^{-4}$<br>A6 = 5.0990 × 10$^{-7}$<br>A8 = 3.6091 × 10$^{-9}$<br>A10 = 3.2895 × 10$^{-11}$ |
| 10th surface | K = −1.6244 × 10<br>A4 = 2.9156 × 10$^{-5}$<br>A6 = 9.5216 × 10$^{-7}$<br>A8 = −8.1202 × 10$^{-9}$<br>A10 = 1.1760 × 10$^{-10}$ |

The first lens group GL1 is composed of a first lens having positive refracting power, a second lens having negative refracting power, a third lens having positive refracting power and a fourth lens having positive refracting power all arranged in this order from the object, while, the second lens group GL2 is composed of a fifth lens which hardly has power and a sixth lens having negative refractive power. The second lens represents a polycarbonate type plastic lens whose saturation water absorption is 0.4%, and the third lens and the fifth lens represent a polyolefin type plastic lens whose saturation water absorption is 0.01%. FIG. 12 is a diagram of lens aberrations at (A) short focal point end, (B) medium point and (C) long focal point end in Example 6.

Now, values of each conditional expression in each example are shown in Table 20.

TABLE 20

| Conditional expression | Example 6 | Example 7 | Example 8 |
|---|---|---|---|
| fw/D | 0.85 | 0.92 | 0.92 |
| $|f_{RC}|/f_w$ | 0.73 | 0.69 | 0.69 |
| $f_4/f_{FC}$ | 1.06 | 1.92 | 1.24 |
| $(\Phi_P + \Phi_5) \cdot f_T^2/F_T$ | | | |
| $(\Phi_{PFC} + \Phi_{PRC}) \cdot f_T^2/F_T$ | −1.73 | −0.46 | −3.16 |
| $(\Phi_P + \Phi_{2-1}) \cdot f_T^2/F_T$ | | | |
| $f_1/f_{FC}$ | 4.15 | 4.52 | 5.70 |
| $D_{ab}/f_{FC}$ | 0.16 | 0.16 | 0.15 |
| $f_{1b}/f_{FC}$ | 0.80 | 0.75 | 0.79 |
| $|f_{RC}|/f_{2-1}$ | −0.001 | −0.001 | −0.001 |
| $f_T/f_{FC}$ | 3.92 | 4.14 | 3.84 |

As shown in Table 20, each value satisfies each conditional expression of the invention.

Since a zoom lens of the invention is constituted as in the foregoing, there are provided the following effects. Namely, the zoom lens of the invention agrees with a camera of a lens shutter type which is corrected in terms of various aberrations satisfactorily and is compact and low cost. Further, the zoom lens is sufficiently corrected in terms of spherical aberration and curvature of field, while being corrected satisfactorily in terms of longitudinal chromatic aberration and lateral chromatic aberration, and is low cost and excellent in image forming performance. In addition, even in the case of a large zoom ratio, the effects mentioned above can be maintained, and various aberrations can be kept to be in good condition despite of temperature fluctuation. Detailed embodiment can be varied by skilled person without departing from the spirit and scope of the invention.

What is claimed is:

1. A zoom lens to form an image of an object with variable magnification, comprising:

a first lens group having a positive refracting power, and a second lens group positioned closer to the image than the first lens group and having a negative refracting power, wherein, when the magnification is changed, a distance between the first lens group and the second lens group is changed, wherein the first lens group consists of a 1-1 lens, a 1-2 lens, and a 1-3 lens aligned in this order from the object and the second lens group comprises a 2-1 lens and a 2-2 lens aligned in this order from the object, wherein the zoom lens comprises at least two plastic lenses, and wherein the 1-1 lens is a plastic lens, the 1-3 lens has a positive refracting power and the 2-2 lens has a negative refracting power, and wherein the 1-2 lens is a plastic lens, at least four surfaces of the lenses in the entire system of the zoom lens are an aspherical surface, and a following formula is satisfied:

$$1.50 \leq n_{2-2} \leq 1.90$$

where $n_{2-2}$ is a refractive index of the 2-2 lens, wherein the 1-1 lens has a positive refracting power and has at least one aspherical surface, the 2-1 lens is a plastic lens and has at least one aspherical surface, and a following formula is satisfied:

$$-5 \leq (\phi_P + \phi_4) \cdot f_T^2/F_T \leq 5$$

where $\phi_P$ is a power of a plastic lens of the first lens group, $\phi_4$ is a power of the 2-1 lens, $f_T$ is a focal length of the zoom lens at a telephoto end and $F_T$ is an F-number of the zoom lens at a telephoto end.

2. The zoom lens of claim 1, wherein the 1-2 lens has a negative refracting power and following formula is satisfied:

$$1.50 \leq n_{1-3} \leq 1.90$$

where $n_{1-3}$ is a refractive index of the 1-3 lens.

3. The zoom lens of claim 1, wherein the 1-2 lens is a plastic lens and following formula is satisfied:

$$1.50 \leq n_{1-3} \leq 1.90$$

where $n_{1-3}$ is a refractive index of the 1-3 lens.

4. The zoom lens of claim 1, wherein the 1-1 lens is a plastic lens having a positive refractive power, the 1-2 lens is a plastic lens, the 1-3 lens is a meniscus shaped glass lens having a positive refractive power wherein an object side surface of the meniscus shaped glass lens is concave, and the 2-2 lens is a plastic lens having a negative refractive power.

5. The zoom lens of claim 1, wherein the 2-1 lens is a glass lens.

6. The zoom lens of claim 1, wherein the 2-1 lens has at least one aspherical surface and following formulas are satisfied:

$$0.64 \leq f_W/D \leq 1.0$$

$$0.50 \leq |f_{RC}|/f_W \leq 0.80$$

where $f_W$ is a focal length of the zoom lens at a wide angle end, D is a length of a diagonal line of an image plane, and $f_{RC}$ is a focal length of the second lens group.

7. A zoom lens to form an image of an object with variable magnification, comprising:

a first lens group having a positive refracting power, and a second lens group positioned closer to the image than the first lens group and having a negative refracting power, wherein, when the magnification is changed, a distance between the first lens group and the second lens group is changed, wherein the first lens group comprises a 1-1 lens, a 1-2 lens, and a 1-3 lens aligned in this order from the object, wherein the zoom lens comprises at least two plastic lenses, and wherein a magnification ratio of the zoom lens is 2.3 or more, the first lens group further comprises a 1-4 lens and the second lens group comprises a 2-1 lens and a 2-2 lens, and wherein the first lens group comprises at least one plastic lens having a negative refracting power and at least one plastic lens having a positive refracting power.

8. The zoom lens of claim 7, wherein the first lens group is divided into a 1-a lens sub-group and a 1-b lens subgroup and a space is provided between the 1-a lens sub-group and the 1-b lens sub-group, and wherein the 1-a lens sub-group comprises at least two lenses comprising at least one plastic lens having a negative power and the 1-b lens sub-group comprises at least two lenses comprising at least one plastic lens having a positive power.

9. The zoom lens of claim 7, wherein the first lens group comprises at least one glass lens and at least three plastic lenses and the second lens group comprises at most two lenses comprising at least one plastic lens.

10. The zoom lens of claim 7, wherein the first lens group comprises at least two glass lenses and at least two plastic lenses, and a following formula is satisfied:

$$-0.50 \leq |f_{RC}|/f_{2-1} \leq 0.20$$

where $f_{RC}$ is a focal length of the second lens group and $f_{2-1}$ is a focal length of the 2-1 lens.

11. The zoom lens of claim 9, wherein all of the plastic lenses of the zoom lens have a saturated water absorption of 1.2% or less.

12. The zoom lens of claim 7, wherein all of the plastic lenses of the zoom lens have a refractive index of 1.5 or more.

13. The zoom lens of claim 7, wherein the 1-1 lens is a plastic lens having a positive refracting power.

14. A camera to photograph an image of an object with variable magnification, comprising:

a zoom lens having a first lens group having a positive refracting power, and a second lens group positioned closer to the image than the first lens group and having a negative refracting power, wherein when the magnification is changed, a distance between the first lens group and the second lens group is changed, wherein the first lens group consists of a 1-1 lens, a 1-2 lens and a 1-3 lens aligned in this order from the object and the second lens group comprises a 2-1 lens and a 2-2 lens aligned in this order from the object, wherein the zoom lens comprises at least two plastic lenses, wherein the 1-1 lens is a plastic lens, the 1-3 lens has a positive refracting power and the 2-2 lens has a negative refracting power, and wherein the 1-2 lens is a plastic lens, at least four surfaces of the lenses of the zoom lens have an aspherical surface, and a following formula is satisfied:

$$1.50 \leq n2\text{-}2 \leq 1.90$$

where n2-2 is a refractive index of the 2-2 lens, wherein the 1-1 lens has a positive refracting power and has at least one aspherical surface, the 2-1 lens is a plastic lens and has at least one aspherical surface, and a following formula is satisfied:

$$-5 \leq (\phi_P + \phi_4) \cdot f_T^2 / F_T \leq 5$$

where $\phi_P$ is a power of a plastic lens of the first lens group, $\phi_4$ is a power of the 2-1 lens, $f_T$ is a focal length of the zoom lens at a telephoto end and $F_T$ is an F-number of the zoom lens at a telephoto end.

15. A camera to photograph an image of an object with variable magnification, comprising:

a zoom lens having a first lens group having a positive refracting power, and a second lens group positioned closer to the image than the first lens group and having a negative refracting power, wherein, when the magnification is changed, a distance between the first lens group and the second lens group is changed, wherein the first lens group comprises a 1-1 lens, a 1-2 lens and a 1-3 lens aligned in this order from the object, wherein the zoom lens comprises at least two plastic lenses, and wherein a magnification ratio is 2.3 or more, the first lens group further comprises a 1-4 lens and the second lens group comprises a 2-1 lens and a 2-2 lens, and wherein the first lens group comprises at least one plastic lens having a negative refracting power and at least one plastic lens having a positive refracting power.

16. A zoom lens to form an image of an object with variable magnification, comprising:

a first lens group having a positive refracting power, and a second lens group positioned closer to the image than the first lens group and having a negative refracting power, wherein, when the magnification is changed, a distance between the first lens group and the second lens group is changed, wherein the first lens group consists of a 1-1 lens, a 1-2 lens and a 1-3 lens aligned in this order from the object and the second lens group comprises a 2-1 lens and a 2-2 lens aligned in this order from the object, wherein the zoom lens comprises at least two plastic lenses, and wherein the 2-1 lens has at least one aspherical surface and following formulas are satisfied:

$$0.64 \leq f_W/D \leq 1.0$$

$$0.50 \leq |f_{RC}|/f_W \leq 0.80$$

where $f_W$ is a focal length of the zoom lens at a wide angle end, D is a length of a diagonal line of an image plane, and $f_{RC}$ is a focal length of the second lens group.

17. A zoom lens to form an image of an object with variable magnification, comprising:

a first lens group having a positive refracting power, and a second lens group positioned closer to the image than the first lens group having a negative refracting power, wherein, when the magnification is changed, a distance between the first lens group and the second lens group is changed, wherein the first lens group consists of a 1-1 lens, a 1-2 lens and a 1-3 lens aligned in this order from the object and the second lens group comprises a 2-1 lens and a 2-2 lens aligned in this order from the object, wherein the zoom lens comprises at least two plastic lenses, and wherein the 1-1 lens is a plastic lens having a positive refractive power, the 1-2 lens is a plastic lens, the 1-3 lens is a meniscus shaped glass lens having a positive refractive power wherein an object side surface of the meniscus shaped glass lens is concave, an the 2-2 lens is a plastic lens having a negative refractive power.

* * * * *

UNITED STATES PATENT AND TRADEMARK OFFICE
CERTIFICATE OF CORRECTION

PATENT NO.    : 6,404,562 B1
DATED         : June 11, 2002
INVENTOR(S)   : Ota et al.

It is certified that error appears in the above-identified patent and that said Letters Patent is hereby corrected as shown below:

Column 27,
Line 59, "subgroup" should read -- sub-group --.

Column 28,
Line 11, "claim 9" should read -- claim 7 --.

Column 30,
Line 24, "an" should read -- and --.

Signed and Sealed this

Eleventh Day of February, 2003

JAMES E. ROGAN
*Director of the United States Patent and Trademark Office*